United States Patent
Tham et al.

(10) Patent No.: US 11,195,327 B2
(45) Date of Patent: Dec. 7, 2021

(54) FOREST SURVEYING

(71) Applicant: KATAM TECHNOLOGIES AB, Malmö (SE)

(72) Inventors: Krister Tham, Lund (SE); Linus Mårtensson, Malmö (SE); Sebastian Haner, Lund (SE); Johannes Ulén, Malmö (SE)

(73) Assignee: Katam Technologies AB, Malmö (SE)

( * ) Notice: Subject to any disclaimer, the term of this patent is extended or adjusted under 35 U.S.C. 154(b) by 0 days.

(21) Appl. No.: 16/488,666

(22) PCT Filed: Feb. 19, 2018

(86) PCT No.: PCT/SE2018/050159
§ 371 (c)(1),
(2) Date: Aug. 26, 2019

(87) PCT Pub. No.: WO2018/156069
PCT Pub. Date: Aug. 30, 2018

(65) Prior Publication Data
US 2020/0066034 A1     Feb. 27, 2020

(30) Foreign Application Priority Data
Feb. 27, 2017    (SE) .................................... 1730048-4

(51) Int. Cl.
*G06T 17/05*      (2011.01)
*G06T 7/80*       (2017.01)
*G06T 7/73*       (2017.01)

(52) U.S. Cl.
CPC ............... *G06T 17/05* (2013.01); *G06T 7/73* (2017.01); *G06T 7/80* (2017.01); *G06T 2207/10028* (2013.01); *G06T 2207/30244* (2013.01)

(58) Field of Classification Search
None
See application file for complete search history.

(56) References Cited

U.S. PATENT DOCUMENTS 9,482,524 B2 * 11/2016 Metzler ................. G01B 21/04
9,969,492 B2 *  5/2018 Detweiler ............. A01M 21/00
(Continued)

FOREIGN PATENT DOCUMENTS

| CN | 1670474 A | 9/2005 |
|---|---|---|
| CN | 103426200 A | 12/2013 |

(Continued)

OTHER PUBLICATIONS

Tang, Jian, et al. "SLAM-aided stem mapping for forest inventory with small-footprint mobile LiDAR." Forests 6.12 (2015): 4588-4606. (Year: 2015).*

(Continued)

*Primary Examiner* — Andrae S Allison

(74) *Attorney, Agent, or Firm* — Renner, Otto, Boisselle & Sklar, LLP

(57) ABSTRACT

A surveying apparatus (100) comprising a controller (CPU), the controller (CPU) being configured to: receive an image stream representing a video sequence; determine a camera pose for a second image in the image stream relative a first image in the image stream; match the first image with the second image, based on the camera pose; and generate a three dimensional model based on the image match.

17 Claims, 16 Drawing Sheets

(56) References Cited

U.S. PATENT DOCUMENTS

| | | | | |
|---|---|---|---|---|
| 2008/0279447 | A1* | 11/2008 | Friedlander | G01C 11/06 382/154 |
| 2012/0148162 | A1* | 6/2012 | Zhang | G06T 7/11 382/195 |
| 2012/0179433 | A1* | 7/2012 | Wivell | G06T 17/05 703/2 |
| 2013/0325346 | A1* | 12/2013 | McPeek | G01N 33/025 702/2 |
| 2014/0163781 | A1 | 12/2014 | Vian et al. | |
| 2015/0062120 | A1 | 3/2015 | Reisner-Kollmann et al. | |
| 2015/0362595 | A1 | 12/2015 | Isaksson et al. | |
| 2016/0292626 | A1* | 10/2016 | Green | G06Q 50/02 |
| 2016/0327653 | A1* | 11/2016 | Humphreys | G01S 19/48 |
| 2019/0003829 | A1* | 1/2019 | Kambla | G01B 11/08 |

FOREIGN PATENT DOCUMENTS

| | | | |
|---|---|---|---|
| CN | 103486919 | A | 1/2014 |
| CN | 104236529 | A | 12/2014 |
| CN | 103486991 | B | 2/2017 |
| EP | 2336719 | A2 | 6/2011 |
| EP | 3182157 | A1 | 6/2017 |
| WO | 2005088252 | A1 | 9/2005 |
| WO | 2006083297 | A2 | 8/2006 |
| WO | 20141112911 | A1 | 7/2014 |
| WO | 2016174659 | A1 | 11/2016 |

OTHER PUBLICATIONS

Pierzchala et al, Mapping forests using an unmanned ground vehicle with 3D LiDAR andgraph-SLAM, Computers and Electronics in Agriculture vol. 145, Feb. 2018, pp. 217-225 (Year: 2018).*

Qian, C.; Liu, H.; Tang, J.; Chen, Y.; Kaartinen, H.; Kukko, A.; Zhu, L.; Liang, X.; Chen, L.; Hyyppä, J. An Integrated GNSS/INS/LiDAR-SLAM Positioning Method for Highly Accurate Forest Stem Mapping. Remote Sens. 2017, 9, 3. (Year: 2017).*

PCT International Search Report for corresponding International Application No. PCT/SE2018/050159 dated May 24, 2018.

Decision to Grant from Swedish Patent Office for priority application SE 1730048-4, dated May 13, 2019, and Swedish granted patent SE 541287.

First Office Action from Swedish Patent Office for priority application SE 1730048-4, dated Nov. 11, 2016.

Search Report from Swedish Patent Office for priority application SE 1730048-4, dated Nov. 11, 2016.

International Preliminary Report on Patentability for Corresponding International Application No. PCT/SE2018/050159 dated Aug. 27, 2019.

Supplemental European Search Report for corresponding European Application EP 18756621 dated Nov. 23, 2020.

* cited by examiner

FOREST SURVEYING

This application is a national phase of International Application No. PCT/SE2018/050159 filed Feb. 19, 2018 and published in the English language, which claims priority to Swedish Application No. 1730048-4 filed Feb. 27, 2017, both of which are hereby incorporated by reference.

TECHNICAL FIELD

The present invention generally relates to methods, devices and computer programs for forest inventory management, such as forest surveying.

BACKGROUND

In today's forestry industry, the trees in a forest are handled as groups of trees, assuming that all trees within a group have more or less the same characteristics. With today's inventory methods, a group of trees normally are quite big (>1 ha). The assumption that all trees have some characteristics is very rough and there is no control of each individual tree. This means that the ground potential is not fully utilized and at the end it leads to production loss, why more precise forest inventory management methods and devices are needed.

However, Forest inventory management is a highly time-consuming and costly task, whether you do it with traditional measurement tools, or with modern solutions such as airborne solutions, laser scanners or cloud servers.

Such solutions are both expensive and complex to implement. For example, using laser scanners require a large investment and specially trained surveyors. Utilizing cloud servers to compute the forest status also most often requires advanced measuring apparatus, and an internet connection, something which is not always possible in rural areas, especially not in developing countries. Aerial solutions also require a large investment and specially trained staff as an aeroplane needs to be purchased or rented.

The most commonly utilized tools are still hand-held analog devices that have not changed for the last several decades. While these tools are fairly fast, the measurement is imprecise, lacks traceability and is highly subjective in the selection of measurement sites. As such, the use requires experience and can still not be trusted.

Solutions have been proposed based on taking pictures from various angles of a forest and then match the pictures to generate a three dimensional model from which trees may be identified. However, such solutions suffer from the vast computational resources required and are as such not suitable for field work. Execution times of hours are discussed and then when being executed on work stations, making such solutions only feasible for providing an analysis only after a field survey has been done and the camera used has been returned to an office set up.

There is thus a longstanding need for cheaper and more reliable devices and methods that does not require a large investment, nor specially trained staff and which results may be trusted.

SUMMARY

The inventors have realized that by, instead of limiting the data to be processed in order to reduce the computational resources needed, the data may be increased so that tools, such as SLAM, may be used to provide for a faster matching of one picture to another, thereby effectively reducing the required computational resources. The inventors therefore propose to utilizing video sequences to generate the three dimensional models.

The inventors base this proposal on the insightful realization that techniques such as SLAM can be used also for surveying, not only for controlling autonomous vehicles. Thus by incorporating this technology from the field of controlling autonomous vehicles, into the field of forest surveying, an improved manner that is capable of being executed even on a contemporary smartphone is achieved. Thus, solving problems such as the long standing problem of how to survey forest areas more efficiently not requiring vast computational resources and/or vast human resources by insightful reasoning and by incorporating technologies from remote technical fields.

The problems of the prior art of suffering from too long computational times, heavy computing resources and/or special equipment such as lasers, that are usually heavy to carry around, requiring vehicles for proper mounting and transport, have thus been overcome by the inventors. Instead of seeking solutions to filter down or reduce the data set to be processed, or finding better matching algorithms, the inventors have realized that by instead doing the opposite, and increase the data to be processed, tools normally only used in other remote fields may be used.

Furthermore, as the teachings herein are proposed to be supplemented only by sensors commonly found in smartphones, such as motion sensors (accelerometers) and/or positioning sensors, such as Global Positioning System sensors or GNSS sensors, and as the teachings herein rely on video camera recording, video cameras being common in smartphones, the teachings herein enable forestry surveys to be performed using a simple smartphone (or tablet), which greatly reduce the investment and also maintenance needed for performing forestry surveys.

It is therefore provided an apparatus to overcome or at least mitigate or reduce the problems discussed herein, the apparatus being a forestry surveying apparatus comprising a controller, the controller being configured to: receive an image stream representing a video sequence; determine a camera pose for a second image in the image stream relative a first image in the image stream; match the first image with the second image, based on the camera pose; and generate a three dimensional model based on the image match; wherein the video sequence and the three dimensional model represent forestry related objects.

It is also provided a method for forestry surveying, the method comprising: receiving an image stream representing a video sequence; determining a camera pose for a second image in the image stream relative a first image in the image stream; matching the first image with the second image, based on the camera pose; and generating a three dimensional model based on the image match; wherein the video sequence and the three dimensional model represent forestry related objects.

It is also provided a computer-readable medium comprising computer program instructions that when loaded into a controller, causes the method according to herein to be executed.

It should be noted that even though the techniques discussed herein have been disclosed as being performed in a handheld device possibly simultaneous with making the recordings, they may also be performed after the recordings have been made by uploading them to a (remote) server.

The manner taught herein also solves a problem of how to match two surveyed areas as discussed below, and it is therefore an object of the present invention to provide a method for matching a first area to a second area, wherein said first and second areas correspond to surveyed areas and each comprises at least one object, the method comprises receiving said first area; receiving said second area; finding a first set of objects in said first area; finding a matching second set of objects in said second area; and stitching together said first area with said second area by overlaying said first and second sets.

It is also an object of the teachings herein to provide a computer program comprising computer executable instructions which when downloaded and executed by a processor of a device causes the device to perform a method as above and also as below.

It is also an object of the teachings herein to provide a device for matching a first area to a second area, wherein said first and second areas correspond to surveyed areas and each comprises at least one object, the device comprising a processor arranged for receiving said first area; receiving said second area; finding a first set of objects in said first area; finding a matching second set of objects in said second area; and stitching together said first area with said second area by overlaying said first and second sets.

As the inventors have also realized, the teachings herein may also be used in other surveying areas, and it is therefore provided a surveying apparatus comprising a controller, the controller being configured to: receive an image stream representing a video sequence; determine a camera pose for a second image in the image stream relative a first image in the image stream; match the first image with the second image, based on the camera pose; and generate a three dimensional model based on the image match.

It is also provided a method for surveying, the method comprising: receiving an image stream representing a video sequence; determining a camera pose for a second image in the image stream relative a first image in the image stream; matching the first image with the second image, based on the camera pose; and generating a three dimensional model based on the image match.

It is also provided a computer-readable medium comprising computer program instructions that when loaded into a controller, causes the method according to herein to be executed.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DESCRIPTION

The inventors have realized that by relying on some specific assumptions about objects, such as trees, it is possible to simply and elegantly extract the main features for objects, such as trees, such as the width and location (at least the relative position of one object in reference to other objects) from a simple video film, possibly filmed with a smartphone.

The inventors have further ingeniously combined trialed video and image processing techniques which have been selected and combined in a manner that enables the analysis to be performed using only limited computational power, so that the analysis may be made by a smartphone, and even at realtime while the video is being recorded.

Using the teachings herein, as invented by the inventors, it is thus possible to conduct forest inventory by simply filming (sections of) a forest with a smartphone, a task that does not require expensive equipment or specially trained staff, and that produces results that are within acceptable accuracy and can thus be trusted.

It should be noted that the manner taught herein may also be executed with any camera having or being connected to a processing unit. Examples of such arrangements are smartphones, tablets, laptop computers, video cameras connected (or configured to be connected) to a tablet, a laptop computer, a smartphone or other processing terminal, surveillance cameras to mention a few examples. Such arrangements will hereafter be referred to as a user equipment UE and an example of such a UE will be given with reference to FIGS. 1A and 1B.

Figure 1A:
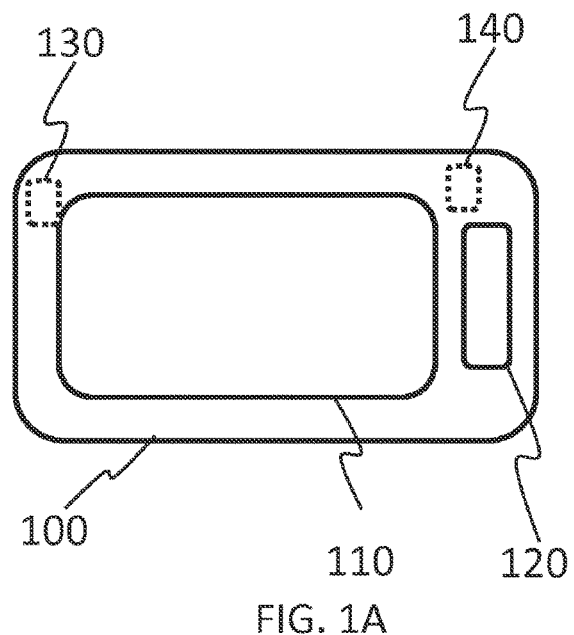
FIG. 1A is a schematic view of a user equipment configured according to an embodiment of the teachings herein.
Figure 1B:
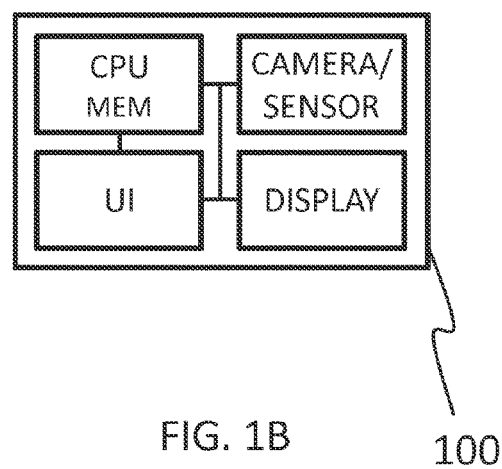
FIG. 1B is a schematic view of the components of a user equipment configured according to an embodiment of the teachings herein.

FIG. 1A shows an example of a User Equipment 100, in this embodiment a smartphone 100. Another example of a UE is a tablet computer. FIG. 1B shows a schematic view of components of a UE 100. The UE 100 comprises a user interface (UI) which in the example of FIGS. 1A and 1B comprises a display 110 and one or more physical buttons 120. The display 110 may be a touch display and the user interface may thus also comprise virtual keys (not shown). The UI is connected to a controller which is configured for controlling the overall operation of the UE 100. The controller may be a processor or other programmable logical unit. The controller may also be one or more such programmable logical units, but for the reasons of this application the controller will be exemplified as being a Central Processing Unit (CPU). The controller CPU is connected to or arranged to carry a computer readable memory for storing instructions and also for storing data. The memory MEM may comprise several memory circuits that may be local to the UE or remote. Local memories are examples of non-transitory mediums. Remote memories are non-transitory in themselves, but present themselves to the UE as transitory mediums.

The UE 100 further comprises or is arranged to be connected to a camera 130 for receiving an image stream from which image stream is to be processed by the controller CPU and at least temporarily stored in the memory MEM. As the camera 130 records a video sequence, the video sequence may simultaneously be displayed on the display 110.

The UE 100 may also comprise sensors, such as an accelerometer 140 configured to provide the controller with sensor data, either to be processed by the controller or (at least partially) pre-processed. In one embodiment, this enables the controller to determine or follow movements of the camera, both as regards lateral movements and changes in angles, that is the pose of the camera. A pose is thus a position and a direction or angle of a camera, resulting in six (6) degrees of freedom indicating how a camera is moved and or rotated making it possible to determine how the camera is moved and or rotated from one pose to another pose. Other examples of sensors include, but are not limited to GNSS device, time of flight sensor, compass, and gyro to name a few.

In one embodiment, as realized by the inventors, this enables the controller to compare a movement in the SLAM data to the sensor detected movements of the camera so that a scale may be determined (as in 592).

The UE 100 may also comprise positional sensors, such as a global navigational system sensor configured to provide the controller with position data, either to be processed by the controller or (at least partially) pre-processed. This enables the controller to determine or follow the actual position of the camera. This position is determined in an external coordinate system (external to the SLAM data cloud), such as a Global Navigation System (GPS or GNSS).

As mentioned above, the inventors of the teachings herein have realized that it is possible to reduce the computational resources needed to perform the image matching of some prior art solutions, by replacing the series of images, with a video or image stream. The difference between an image stream and a series of images is thus that the image stream comprises images that are taken at regular time intervals, and where the time intervals are very short, for example representing 30 images per second or higher, whereas a series of images, are images taken at irregular intervals and where the intervals are generally longer in the order of an image per 10 seconds or more, even minutes.

The inventors have realized that by actually increasing the data to be processed, the computational resources needed may be significantly reduced as there will be a more strict correlation between each image, which will make the image matching faster and more efficient. Thus, by realizing that stepping from photographic single shot series to video streams, and thereby increasing the data to be processed by a huge factor, the image matching may be done more effectively and thereby also reducing the computational resources actually needed. This is made possible by the realization that by using techniques such as SLAM (Simultaneous Localization And Mapping), the camera's position may be determined, whereby the matching between subsequent images becomes much simpler as their positional relationship is known.

Figure 2:
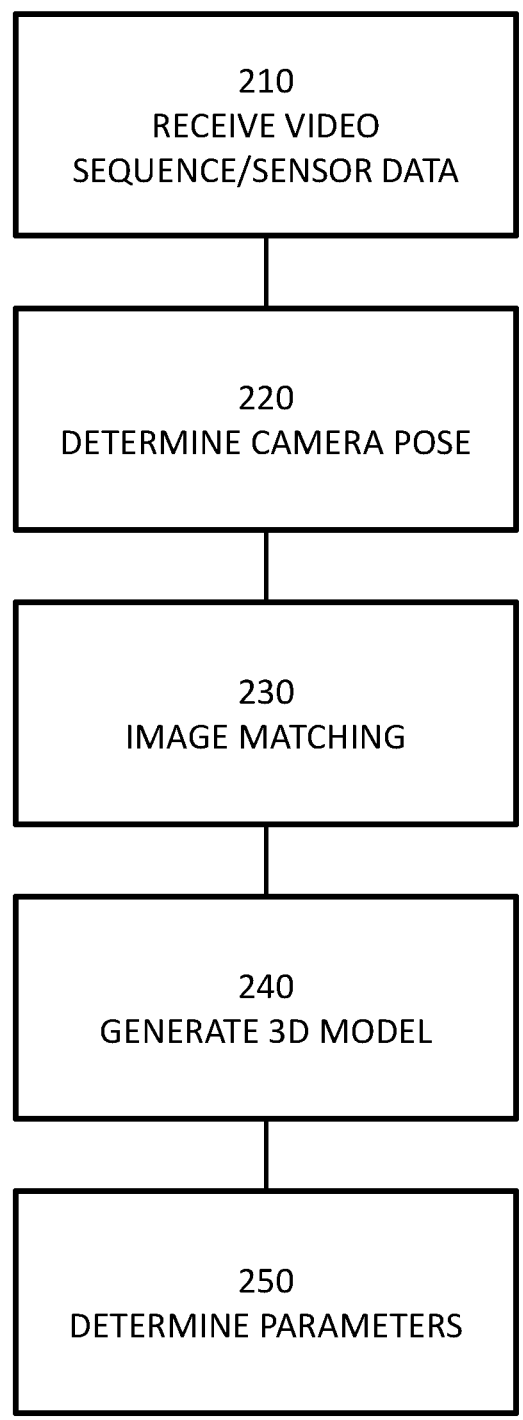
FIG. 2 is a general flowchart of a method according to one embodiment of the teachings herein.

A high level description of a manner for executing the present invention for providing forestry related parameters will be given with reference to FIG. 2 which shows a flowchart for a general method according to an embodiment of the present invention. The UE receives 210 a video sequence (or an image stream), possibly along with sensor data, determines 220 the camera's position and angle, i.e. the pose of the camera, and performs image matching 230 between the respective images in the video sequence using the camera's position, and thereby generates 240 a three dimensional model of the filmed area and any objects therein. The three dimensional model may then be used to determine 250 various forestry related parameters.

The sensor data may relate to positional information, such as GNSS or GPS coordinates or other data. The sensor data may also or alternatively relate to motion information, such as accelerometer or gyro data.

This manner may be used to survey a forest area thereby overcoming the problems discussed in the background section. This manner may also be used to determine other forestry related parameters such as the amount of timber in a pile of logs. This manner may also be used to determine other forestry related parameters such as the amount of chippings in a pile of chippings.

In further embodiments, comparable to those of FIGS. 15, 16, 17 and 18, the teachings herein may also be used, as realized by the inventors, for analyzing and determining the content in piles of gravel, piles of sand, piles of grain, piles of potatoes (or other agriculture-related piles) and even in determining the content of blocks of stone or ore and goods and cargo packing.

Figure 4:
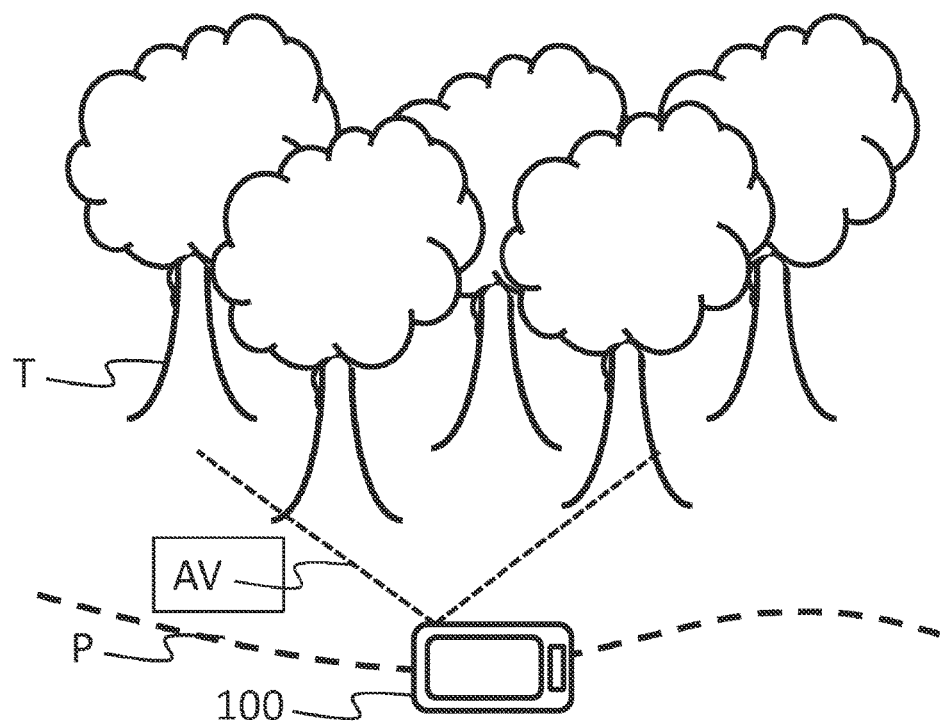
FIG. 4 is a schematic view of one example use of a user equipment according to one embodiment of the teachings herein.
Figure 3:
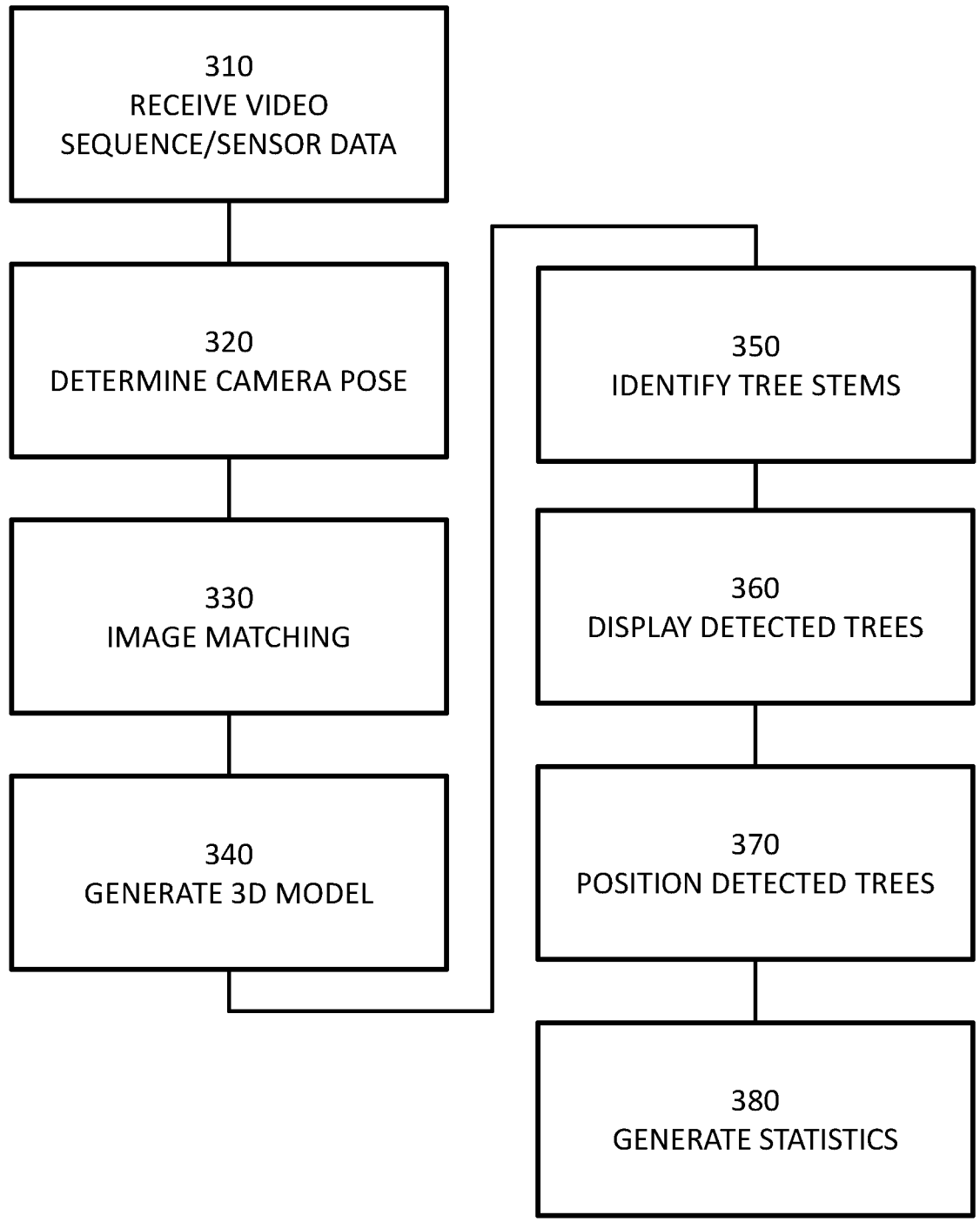
FIG. 3 is a general flowchart of a method according to one embodiment of the teachings herein.

A high level description of a manner for executing the present invention will be given with reference to FIG. 3 which shows a flowchart for a general method according to an embodiment of the present invention and to FIG. 4 which shows a schematic view of a UE, such as a smartphone, configured to work according to the present invention in a forest environment. A more detailed description will follow below.

The UE 100 is configured to receive a video sequence (an image stream) of a currently surveyed area comprising a number of objects, such as a forest area comprising trees T. The video sequence may comprise meta data, such as by capturing the video sequence (comprising an image stream)

with a (possibly built-in) camera 130. The video sequence may be received along with time-stamped sensor data or other sensor data, the sensor data being (a portion of) meta data in a first step 310. The sensor data may relate to positional information, such as GNSS or GPS coordinates or other data. The sensor data may also or alternatively relate to motion information, such as accelerometer or gyro data.

The image stream is generated or captured so that multiple angles of the same area are captured. This may be achieved by simply walking the UE holding the camera along a path P through an area possibly sweeping the camera back and forth thereby also increasing the size of the surveyed area captured by the camera's angle of view AV. At the same time the metadata may be generated. One example is movement data that is generated by the accelerometer 140.

It should be noted that the camera may be brought through a forest in many different ways.—for example it can be carried by a user or operator that walks through a forest. It can also be positioned on a vehicle, such as a forestry vehicle or an all-terrain vehicle (ATV). The camera may also be brought by a drone, commercial or hobby.

However, unlike prior art solutions, the teachings herein benefit from not requiring vast computational resources and are as such suitable for use in a handheld device that is simply walked through a forest unlike the prior art solutions which are—in some manner—dependent on bigger and heavier equipment, be it sensors or computational resources.

In one embodiment the camera is configured to use a wide-angle lens. If a wider angle than the one originally configured for the camera, the camera may be equipped with a different lens or an add-on lens. A wider angle enables for more trees or objects to be recorded in each camera angle and frame. If a lens, such as a fish-eye lens is used, the manners herein may be configured to take this into account by compensating for angular distortion at the edges of a frame.

The image stream is then analyzed by the controller CPU of the UE 100 by determining 320 the pose of the camera and through a series of image processing algorithms 330 to generate a three dimensional 3D model of the forest area currently being surveyed in a fourth step 340.

It should be noted that the image stream may be analyzed at the time it is received, such as at the time it is captured or at a later stage such as when it is being viewed.

The algorithms used may include for example image segmentation, SLAM, depth map estimation, point cloud generation and merging thereof, edge detection, cluster detection, deep learning, and more to estimate relative and absolute positions and parameters of trees in the video, as well as information on the surrounding terrain for example retained from receiving a current position from a Global Navigation Satellite System (GNSS) and checking that position in a map program.

As the 3D model has been generated, stems of the objects or trees in the image stream are identified 350. Making assumptions that a tree stem generally has two straight and parallel sides and that the sides end and start at approximately the same level makes it fairly easy to identify the stems and therefore also the trees, the number of trees, the width of the trees and the (relative) location of the trees as is done in one embodiment. In one embodiment, it may also be determined whether the color of the tree stem is different from the background to identify the stems.

By realizing that a simple 3D model may be generated even in a smartphone, and by identifying the trees in the 3D model, a relatively accurate estimation of the tree density in an area may be provided in a manner that is simple and cheap to execute and that does not require expensive specialized equipment.

In order to provide a visual feedback of the tree density and such, but also to provide a correction mode, the detected trees may be presented 360 on the display 110 of the UE 100 by simply overlaying graphical representations, such as cylinders, of the detected trees on the video being recorded or viewed.

As the image stream is recorded or captured, it is beneficial if the camera is moved so as to capture multiple angles. This may be achieved by simply instructing a user or operator to record a video when walking through the forest, either in a recommended pattern through a single measurement zone, or as a free walk throughout the forest.

In one embodiment, the video recording comprises a plurality of video recordings, some of which may have been done at different times, and some of which captures different angles of a tree or several trees. In this manner, the information available for a given tree may be supplemented over time as the actual position of a tree may be determined, whereby the tree may be identified as being the same in different recordings.

By using the meta data, the position of the captured or surveyed area may be positioned 370 within the forest, especially if the sensor data includes GNSS positions.

Statistics may then be generated 380 over several recordings by comparing them based on their corresponding positions, or find statistics, such as tree density distributions, diameter distributions, terrain flatness index, and similar.

During the recording, the algorithms may be run in real-time to produce information on the current measuring location. This information can be used to determine, among other things, the size of the area that has been covered when measuring a zone. The real-time data can provide an error estimate in the test. Once this error estimate is below a tolerance level, there can be an indication provided to the user that the current measurement is done.

When walking through the forest, as proposed by the present invention, instead of only targeting selected test areas, several benefits are achieved. One benefit is that the camera gets closer to several more trees than it would have focusing on surveying fixed test areas. The closer view of more trees, giving a more detailed view of the trees, may be used to increase the accuracy of the image processing in that it will be given better grounds for determining trees (more high resolution trees with color and texture to compare with as is done in some embodiments).

Furthermore, the same error tolerance can be used to split a measurement into multiple individual measurements, and provide relevant information on the area the user is currently in rather than averaged measures for the whole path, though both may be relevant. This enables an operator or system designer to, depending on different criteria, split up or partially process a measurement in distinct processes which can then be referred to individually or communally.

In one embodiment, the UE is configured to recommend new locations that will optimize coverage of the forest based on finished recordings and their positions. This may be done in different manners. In one embodiment, the UE is configured to select the location with the largest distance to all previous recordings, each recording being associated with a location through the meta data for that recording. In such an embodiment, the measurements on the forest are determined as complete when the largest distance to another measurement zone is below a threshold level. Alternatively or additionally, the UE may be configured to determine the coverage of previous measurements by mapping an area starting at the location of each recording and extending in the directions covered b the camera (based on the view angle of the camera in relation to the position, a compass direction and movements determined through an accelerometer or compass—all comprised in the meta data. The sensors may have an accelerator and/or a compass for providing a camera angle which may also be part of the meta data. The UE may then be arranged to identify areas having a a congruent form and an area exceeding a threshold value and propose such areas as a next area to be surveyed. As no more areas exceeding the threshold is found, the measurements are deemed complete.

In one embodiment, the UE is configured to recommend locations by providing or suggesting a path through the forest and request a number of measurements along this path, such that both the total distance traversed is minimized, and the largest distance to a measurement zone within the forest is below the distance threshold after the whole path is walked. Such a recommendation would also take into account terrain, paths through the forest and forest boundaries from a GIS-system, so that the recommended path is both traversable and relevant.

Figure 5:
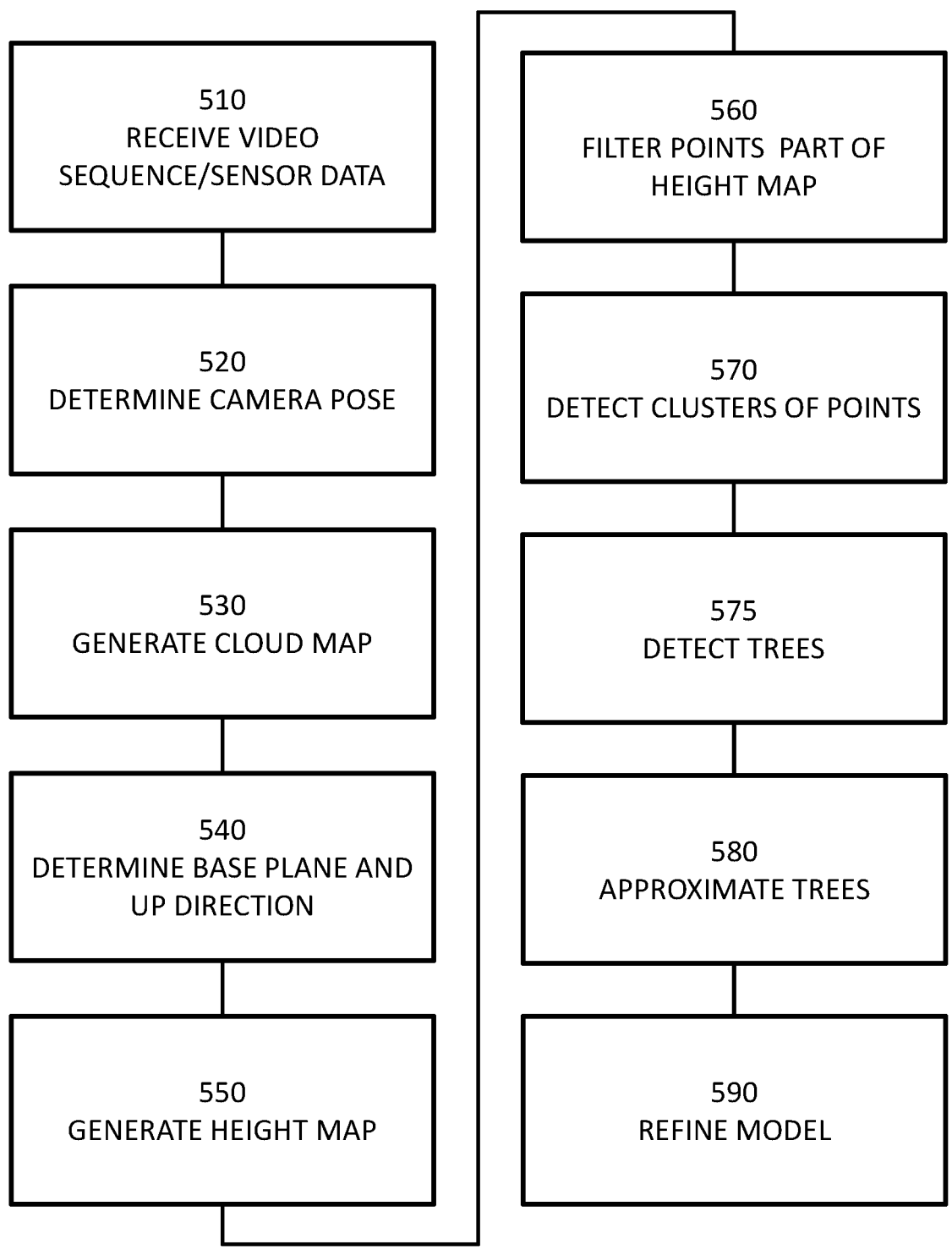
FIG. 5 is a general flowchart of a method according to one embodiment of the teachings herein.
Figure 6A:
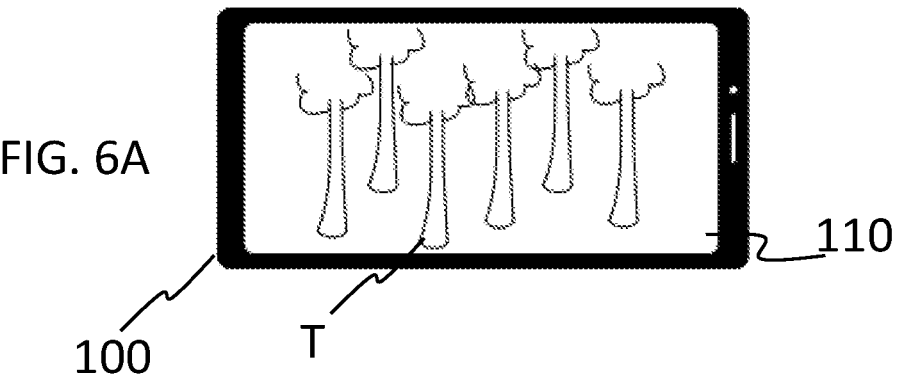
FIG. 6 is a schematic view of one example use of a user equipment according to one embodiment of the teachings herein.

FIG. 5 shows a flowchart for a more detailed method according to one embodiment of the present invention. FIGS. 6A to 6F Shows schematic views of partial and final processing results performed using the method of FIG. 5. As for the method of FIGS. 2 and 3, the UE 100 receives a video sequence 510 of a forestry related area, such as a portion or area of a forest, see FIG. 6A showing the display of a UE 100 showing a video of a forest area including some trees T. The video sequence comprises a plurality of image frames or simply frames that are analyzed individually (at least some of them) by, for each analyzed frame, running an algorithm to provide a camera position 520 and a point cloud 530.

The video sequence is possibly accompanied by sensor data. In one embodiment, a sparse point cloud is used. In one embodiment a dense point cloud is used. In one embodiment a combination of a sparse and a dense point cloud is used The sensor data may relate to positional information, such as GNSS or GPS coordinates or other data. The sensor data may also or alternatively relate to motion information, such as accelerometer or gyro data.

In one embodiment a SLAM algorithm is used to provide the point cloud and the camera position. SLAM (Simultaneous Localization And Mapping) is the computational problem of constructing or updating a map of an unknown environment while simultaneously keeping track of a unit's location within it.

SLAM originates in robotics, and the inventors have thus realized that by combining algorithms traditionally used in the remote field of robotics, an improved forestry management may be achieved. Furthermore, as some SLAM algorithms rely on multiple angles of an object having been captured, but as most tablets and smartphones and other small, handheld devices mostly only covers one camera angle (apart from having two cameras arranged in opposite directions, the inventors have overcome this by moving the camera around, thereby simulating more than one sensor, as multiple angles are captured by the same camera/sensor. Moving the camera around while filming/recording has several benefits compared to taking the same video from two vantage points in that only one user action is required and that more than two angles are captured simultaneously. Also the relationship between the two positions need not be given as that information will be included in the continuous image stream captured. Furthermore, as the manner herein is highly suitable for small device cameras, it is also highly suitable for manual recording (or possibly drone recording). Such manual recording is very difficult to achieve without the camera being moved in different directions. A person holding a camera while walking through a forest is highly unlikely to keep the camera stable. The manner proposed of how to record the video sequence, thus further increase the efficiency of the manner in a positive circle.

Figure 6B:
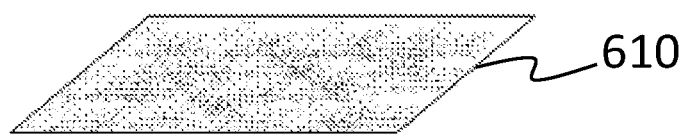
Figure 6C:
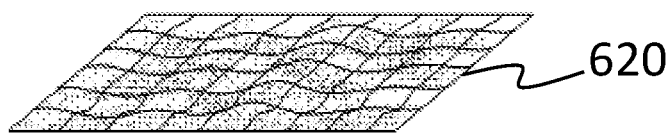

A base plane and an up direction in the point cloud are determined 540. In one embodiment this is done by filtering points and fitting a base plane to the data filtered points. In one embodiment this is done by using a RANSAC algorithm. Random sample consensus (RANSAC) is an iterative method to estimate parameters of a mathematical model from a set of observed data that contains outliers, when outliers are to be accorded no influence on the values of the estimates, the base plane being the mathematical model, and the outliers and inliers being points in the point cloud. FIG. 6B shows a base plane 610.

A height map is generated 550, in one embodiment by dividing the point cloud into 2D cells along a plane, and finding a median distance from each point cloud point in the corresponding cell to the plane. When detecting trees, points that are near the ground—as specified by the plane and height map—will be filtered out.

Figure 6D:
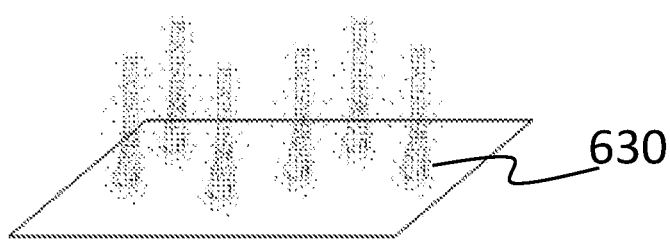

To identify 575 the trees, clusters of points are detected 570 in the remaining points. In one embodiment this is done by for all points finding all other points that are within a distance threshold to the current point. Each such cluster is assumed to be a tree. Seen from the base plane, there will be a higher density of points at the locations/positions where there is a tree, as the points can be on top of one another along the stem of the tree. These points may be seen as a cluster of points which can be identified through a density mapping, similar to the height map, but instead of determining a median point it is determined how many points that are part of each grid cell. Those grids that have significantly more points than the surroundings are initially regarded to be trees. A filtering may then be used to finally determine whether it is a tree or not. A cluster is thus initially regarded to be a tree. FIG. 6D shows examples of such point clusters 630.

Figure 6E:
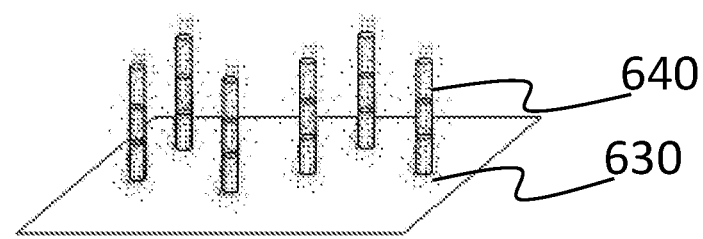

To provide an approximation of the tree a geometrical approximation, which may be displayed as a graphical indication, is fitted to each cluster 580. In one embodiment this is performed by using a RANSAC algorithm. The geometrical approximation may be a cylinder, two parallel lines, a rectangular body, a cone or two lines that in their extensions are converging. FIG. 6E shows examples of such graphical approximations (possibly indicated by graphical indications) 640 having been applied to the point clusters 630.

Figure 6F:
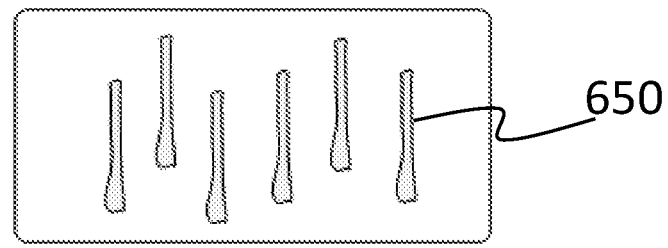

To provide 590 a refined 3D model the detected trees are filtered through an image segmentation algorithm, such as a deep learning network, an artificial neural network or a convolutional neural network, which determines whether a pixel is part of a tree, based on various parameters. Examples of such parameters are image patches (image patches being defined as a rectangular subset of the image). FIG. 6F shows examples of such refined detected trees 650.

In one embodiment, the image segmentation algorithm may be arranged to concurrently or subsequently also determine other relevant information such as the type of tree.

In the below, there will be given examples of parameters that may be provided using the teachings herein, and how they may be used.

It should be noted that SLAM is not the only technique necessary or possible to use for analyzing the video recording. As the video recording provides a more fluent indication of the change of camera position it also lends itself to alternative image analysis such as deep recurrent convolutional neural networks (RCNN). Using such methods, the forest survey may produce a rough estimate without performing the SLAM analysis.

Also, the above (and below) described generation of a base plane and a height map may be optional and are not essential, but do provide a clear benefit in that it is easier to find the clusters representing trees.

As an optional step the UE may be configured to provide a scale correction measurement, based on sensor information (GPS or otherwise achieved position in combination with SLAM). This may be done by estimating the scale factor between the accelerometer and the second derivative of the corresponding camera/SLAM position through a filter, such as a Kalman filter or by a matching algorithm that aligns the accelerometer data from the sensors with acceleration data determined from the SLAM-determined movements. As the acceleration from the sensors is absolute/real, the acceleration in the model may be aligned to provide for a scale. The scale correction measurement is used to calibrate 590 the SLAM algorithm used.

Figure 7:
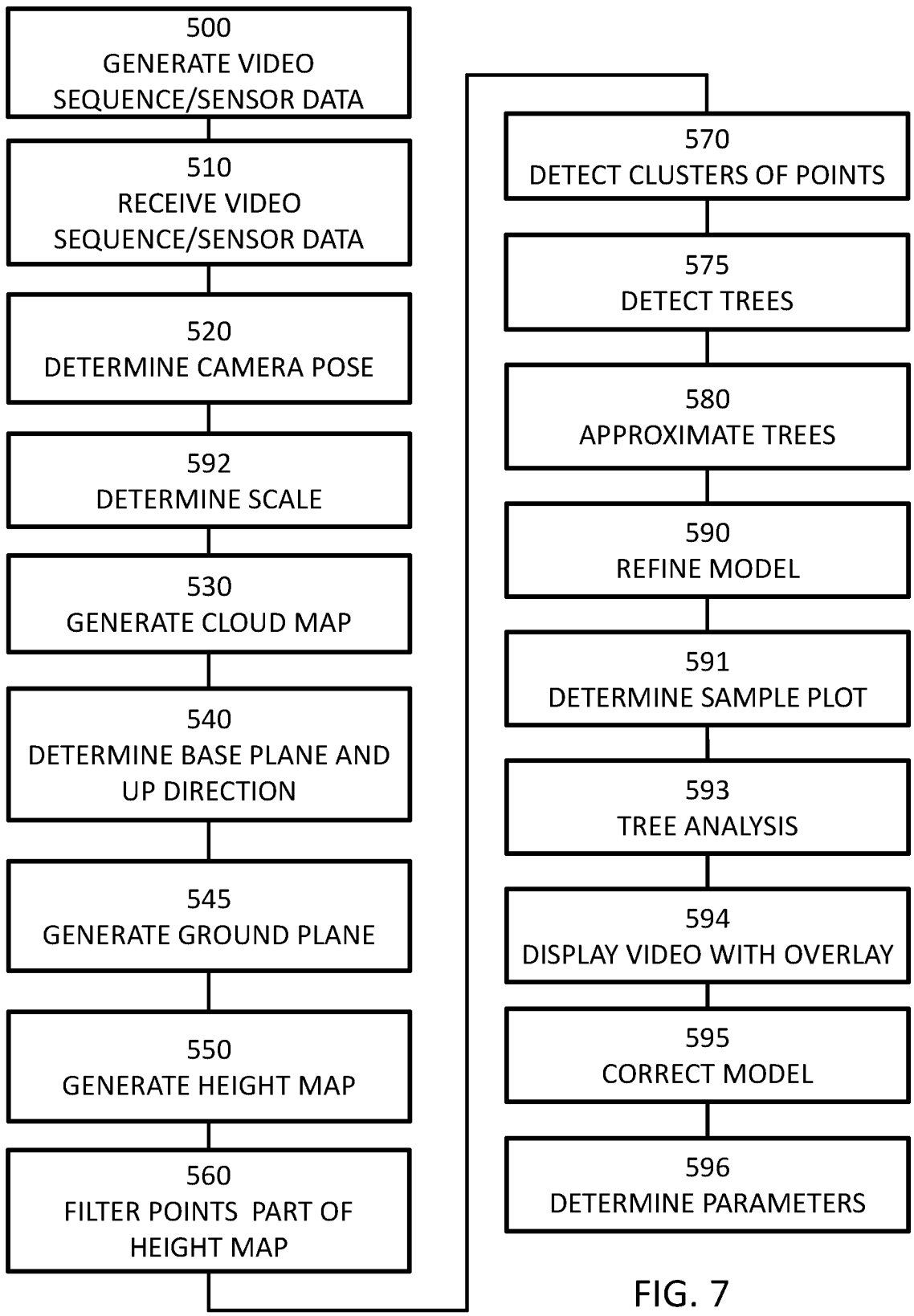
FIG. 7 is a general flowchart of a method according to one embodiment of the teachings herein.

FIG. 7 shows a flowchart of a more detailed method according to the present invention. In a first step 510 an image stream is received of a first forest area. The image stream includes meta data recorded by sensors in connection with recording the image stream. Examples of such sensors are GNSS sensors, accelerometers, digital compasses, gyrometers (providing both direction changes and linear movements possibly to compliment the GPS positions) or time of flight sensors. The image stream may be received from an internal camera or an external camera as the image stream is being recorded or captured. Or the image stream may be received as a previously captured or recorded image stream.

The image stream has thus been generated in an earlier or simultaneous step 500, by a user or operator moving around with the camera to capture the ground and trees from different positions and thus capturing multiple angles. It should be noted that although the description herein is focused on a user or operator moving the camera, in one embodiment where the camera is carried by an automated vehicle, such as a preprogrammed drone (see FIGS. 9A and 9B) or robotic work tool traversing the forest, the automated vehicle is programmed to move the camera so that multiple angles are covered. It should also be noted that the user or operator need not move the camera around manually, but the camera may be carried by a remote controlled vehicle controlled by the operator. The camera may also be mounted on a vehicle (directly) controlled by the user or operator.

It should be noted that although only one camera is mentioned to be utilized herein, the teachings may also be applied and with added benefit to constellations with multiple cameras. The added benefit lies in that as the teachings herein provide a manner for determining how one camera has moved, the same movement may be used to the whole constellation thus enabling for more video recording angles but without requiring a linear or worse additional processing.

In one embodiment the image stream is recorded by walking in a closed loop, such as an ellipse, a square/rectangle, back and forth or any other closed looped pattern, to facilitate a more accurate motion tracking in the SLAM algorithm to be applied.

In one embodiment the image stream is recorded by walking in a straight line, or in a curved line, with the camera angle being at a right angle to the direction of movement.

As the image stream has been received, the camera pose and/or position is estimated 520 through Simultaneous Localization and Mapping (SLAM) algorithms. This is for example done by tracking the motion of a set of points between images or frames in the image stream, construct key frames and storing the point locations seen in the key frames and then determine the camera position based on the movement respective to each key frame. A key frame is a concept that is used in searching. A key frame comprises the camera position, the video image and other meta data, such as the position of the key frame in relation to adjacent key frames, the preceding and succeeding key frames, the positions of each known point at this time. This enables for a reconstruction of at least parts of the camera sequence, if it is later determined that an error has been introduced. It can also be used to re-step to a measurement set if a reference is temporarily lost.

A key concept of SLAM techniques is that they analyze movements of objects, in subsequent images, and recreate the camera's movement and the position of the object(s) in space. It should be noted that other SLAM techniques apart from those disclosed herein in detail may also be used for implementing the teachings herein.

As the camera position has been determined, a point cloud is determined 530 by estimating a depth map based on the calculated camera poses/positions and corresponding frames, fusing each point in the depth map into a larger point cloud, and generating new points in the cloud when there is no corresponding point to fuse with.

The depth map may be constructed in a manner similar to tracking an image point in a sequence of video images, but with a high density, for example by following each image point. Due to the SLAM process, the camera movement is known and the depth of each point is determined based on the point displacement.

As the camera movement is known and the distance from the camera to a point, it is possible to add a point to a common coordinate system, that of the camera(s) and it is then also possible to find points that are close to one another. Points that are very close to other points may be regarded as being the same point and can therefore be fused.

Also as the image stream has been received, possibly in conjunction with determine the point cloud, a ground model is determined 545 by fitting a single plane to a set of points with a high enough confidence.

The confidence may for example be determined based on the distance of the movement until the point was found in the depth map or how well one point's movement corresponds to the movement of the surrounding points.

Also as the image stream has been received, possibly in conjunction with determine the point cloud, trees are identified in the image stream and possibly associated with a location and/or various tree attributes. The trees are identified by splitting the point cloud into a 2D grid from the normal direction of the ground plane, filter out all points that are within a threshold distance to the plane, finding all clusters with many remaining points (i.e. points that are outside a threshold distance to the plane) and assume these are trees. The trees may then optionally be approximated for example by fitting lines, rectangles or cylinders or other geometrical shapes to these clusters. Other embodiments may use other algorithms for identifying trees, such as in one embodiment utilizing edge detection and/or tree segmentation for example being based on a deep learning network, such as an Artificial Neural Network (ANN) or a Convolutional Neural Network (CNN).

A three dimensional (3D) model is thereby provided of the test area with the trees approximated by for example lines. The inventors have realized by approximating a view of the forest by a 3D model, many measurements may be made in the 3D model at a high enough accuracy, thus providing reliable and objective results that may be trusted.

As the trees have been identified and approximated in the 3D model, a sample plot may be determined 591 by determining all locations along the plane representing the ground which have been accurately recorded by the camera, that is that have been recorded with a confidence higher than a threshold value, such that it is likely all trees were detected and marking this area as a sample plot and determine its size.

The sample plot may be used to determine a basal area and thereby a density of trees. As the trees have been identified, and their approximate width has also been determined, through their detected stems, the tree density of the area may also be determined through a simple divisional operation. The tree density of an area may be defined as the volume of tree (or timber) per area, such as cubic meters of tree per acre (m3/ha)

The UE may also be configured to calculate an absolute scale 592. In one embodiment this is done by determining an average distance between the camera and the ground plane. The measured height and the determined average distanced thereby giving the scale factor as they represent the same height.

In one embodiment, the UE may be configured to determine the scale by identifying an object having a known size in one or more frames. The known object may be a scale indicator that is placed in the area by the operator. The scale may then be determined as the distance to the object in the 3D model is determined in the 3D model.

In one embodiment this is done by comparing the accelerometer movement to the determined movement using the SLAM technology.

The scale may be utilized for optimizing the size of the point cloud that is generated when determining the point cloud 530.

The UE may also be configured to make further tree analysis 593, possibly through segmentation as discussed above, such as determining tree curvatures, determining tree species and detection of tree branches. These factors may be used to identify trees (curvatures and branches) and also to identify the tree type or tree species for providing a more detailed survey result, without the user or operator having to know different tree types.

The UE may also be configured to display 594 recorded video with overlay of trees, ground model and sample plot boundary to provide both visual feedback, but also to offer an opportunity to give feedback such as by receiving corrective commands that amends the 3D model.

The UE may also be configured to use stored camera poses and fitted tree information to render trees or graphical objects or indications representing trees on top of the video sequence for enabling a user or operator to identify which trees have been detected by the UE. Other components or parameters may also be rendered in a similar fashion as necessary/desirable.

The UE may thus also be configured to receive user commands 595 for correcting the 3D model. The user commands may for example relate to a selection of and subsequent and correction of trees, their shapes and/or positions.

As a correction or series of corrections have been received and executed, meaning that the 3D model is changed, other features and parameters may be recalculated, and the 3D model may be redisplayed. The user may then provide a final confirmation for the model. Alternatively, the 3D model may be changed at any subsequent time.

As a 3D model has been provided forestry relevant parameters may be determined 596 based on the 3D model that would be difficult to otherwise determine without the proper training and knowledge, and in a time consuming manner. The parameters and how they are determined will be disclosed and discussed further in the below. The parameters may be used in subsequent determinations and/or presented to the user or operator.

The 3D model, possibly along with the parameters and any measurements made, may be saved for later retrieval. The storing may be done locally or externally such as in a server or in a cloud server.

The UE may also be configured to align the test plot or area geographically by comparing it to a second measurement that at least overlaps the test area, by comparing specific patterns of the test plot and finding matches. The Swedish patent application SE 1630035-2 discloses one manner of doing so that may be used beneficially in combination with the teachings herein.

The UE may also be configured to align the test plot or area to other adjacent test plots, also by comparing the test plots to be aligned with at least one second set and by finding matching patterns, identifying the test plots relative positions. The Swedish patent application SE 1630035-2 discloses one manner of doing so that may be used beneficially in combination with the teachings herein.

The UE may also be configured to identify and provide a (GNSS) position for each individual tree in a test plot, by comparing the test plot with a second test plot and by finding patterns, it is possible to identify a single tree, and if one or both of the test plots is associated with an accurate position, the position of each tree within that plot may also be determined. The Swedish patent application SE 1630035-2 discloses one manner of doing so that may be used beneficially in combination with the teachings herein.

The geographical position may be displayed for the user with relevant map information and if needed, a more detailed 3D-modelling and plot stitching may be performed on a remote server (and/or locally in the background) which may refine the model and the determination of the forest parameters.

The individual trees, their positions as well as the boundaries for the test area and many important parameters may thus be provided to a user by simply filming a plot area from different angles, such as when moving a camera through the area. The manner taught herein only uses algorithms that are capable of being performed and executed on a handheld device, such as a smartphone thanks to the clever assumptions and realizations made by the inventors.

As mentioned above, the teachings herein may also be used to provide parameters that are useful in the forestry industry. Some such parameters, and how they are determined will be discussed below.

It should be noted that while these descriptions of how to determine these parameters are given with reference to the teachings herein as regards generating a 3D model, they may also be used with other manners of generating a 3D model.

One parameter that may be determined more easily using the teachings herein is the actual plot area. The plot area is used to estimate the total tree volume or volume per hectare in a forest stand (a forest stand being a limited forest area with relatively homogenous tree population). When doing so it is inefficient to measure every single tree and the corresponding ground area. To simplify this procedure, it has been agreed through the Nordic forest management standard to limit the forest inventory to measure only a number of forest plot areas. Detailed measurements are performed on each plot, which are then used for calculating an average for the entire stand. Common tools for performing the measurements are relascopes, calipers, measurement tapes and height meters (clinometers).

When recording a forest plot, for example through photographing, videographing, or laser scanning etc, the recorder captures a large number of trees, both trees that are located close to the recorder and trees located far away from the camera. A tree at a long distance will most often not be recorded with as high an accuracy as a tree close to the recorder, which means less information about the tree is available resulting in a lower confidence in the tree attribute description. When generating a 3D model of a recorded forest plot, such as through a method described above, the UE or other system, such as a remote server, sorts out which trees are located too far away from the recorder to provide any meaningful data.

Figure 11:
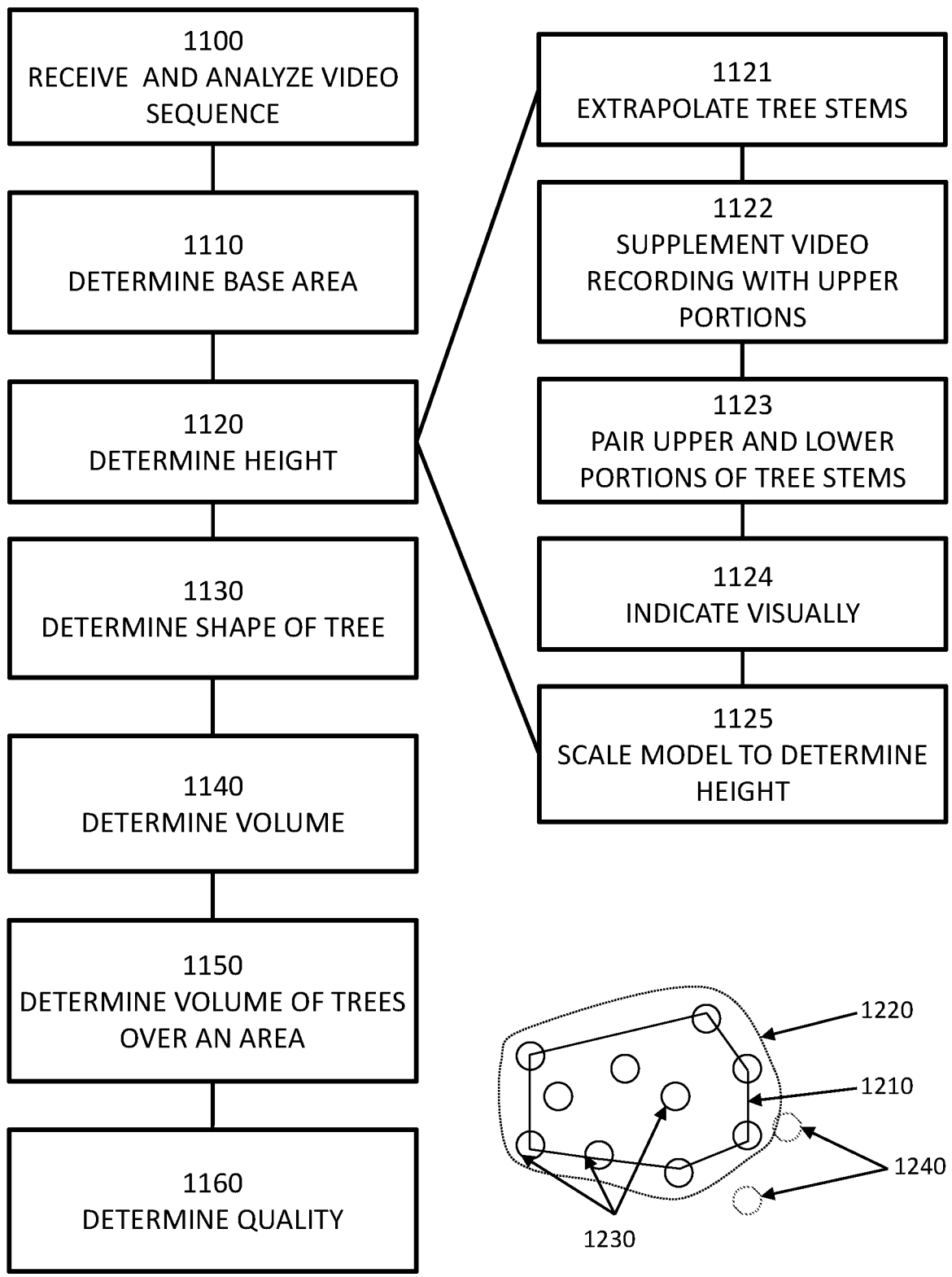
FIG. 11 is a general flowchart of a method according to one embodiment of the teachings herein.

FIG. 11 shows a flowchart of a general method according to an embodiment of the teachings herein. A 3D model of a recorded plot area is generated 1110. The UE then defines 1120 a boarder or "hull" that defines the actual plot area. Inside the plot all included trees are well-defined and carrying a high accuracy of forestry attributes or parameters. The boarder thus provide for a well-defined plot area.

With a well-defined area of the plot, it is possible to determine a number of forest parameters, like e.g. number of trees per hectare. The trivial solution is to define a circular or rectangular plot. But in order to maximize the area of the plot, a "convex hull" around the outer trees could be applied (see FIG. 12). However, if the plot area is not homogenous, i.e. there are certain unknown areas within the plot area, this need to be taken into consideration when calculating e.g. number of trees per hectare. Another problem is to define the area without getting boundary value problem (see FIG. 12).

Figure 8:
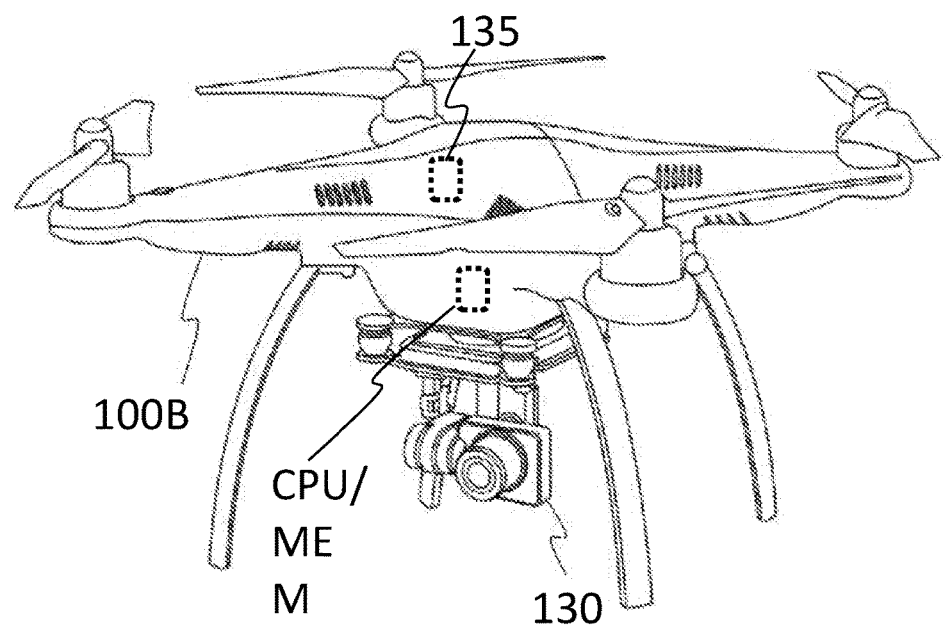
FIG. 8 shows a drone and UE system adapted according to one embodiment of the teachings herein.
Figure 8:
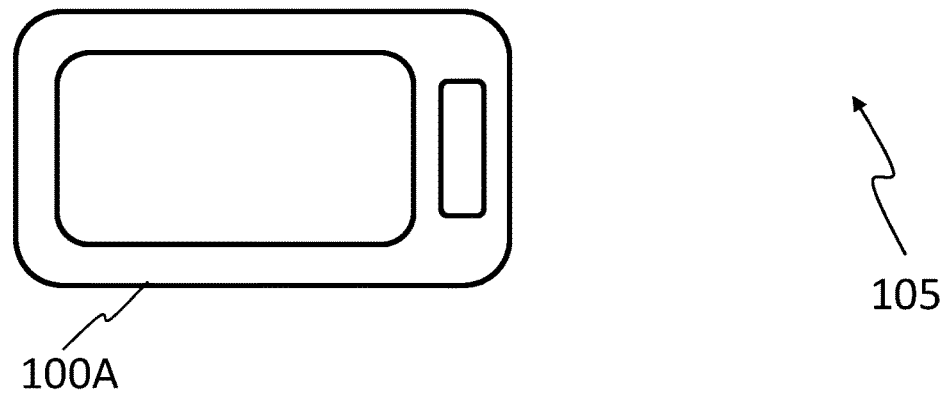

As mentioned above, in one embodiment the UE is arranged to be carried by or be part of a Unmanned Aerial Vehicle or System (UAV or UAS), hereafter referred to as a drone. FIG. 8 shows a view of a drone 100B carrying a camera 130 as well as other sensors 135. Examples of such sensors are accelerometers, GNSS device, time of flight sensors, compass, gyro to name a few. The drone 100B comprises a controller for controlling the overall operation of the drone 100B including flight control and camera control. The controller is connected to a memory for storing instructions and data related to the operation and filming of the drone.

The drone 100B may be remote controlled or it may follow a set flight path or execute a combination of receiving remote control instructions while executing a flight path.

The drone 100B comprises a wireless interface for receiving control instructions through, and possibly also for transmitting a video sequence as it is recorded for possible storage at another location.

The drone 100B may also be arranged for autonomous operation, wherein the drone would receive an indication of an area to be surveyed and then by itself determine a flight pattern for covering that area. The area may be specified by coordinates, or by being demarcated y for example radio frequency, wireless communication, magnetic or light emitting posts or other markers. The drone may cover the area in a random pattern or in a regular pattern or in a combined random and regular pattern. In one embodiment, the drone is arranged to fly at or close to ground level, as in under the level where the tree crowns (on an average) start.

The drone could possibly be arranged to, by itself, determine when an area had been covered sufficiently, for example by determining that the flight pattern, possibly in combination with the camera angle and camera movement, had covered enough of the area to be surveyed.

The drone 100B may be part of a drone system 105 as shown in FIG. 8, where a drone 100B is connected to a UE 100A, such as the UE 100 of FIGS. 1A and 1B, for receiving remote control instructions and/or for providing video streams, thereby enabling the UE 100A to remotely control the drone 100B for recording a video sequence. In one embodiment, the drone 100B is configured to perform some of the processing, while the UE (and/or a server) performs the remainder of the processing.

Figure 9:
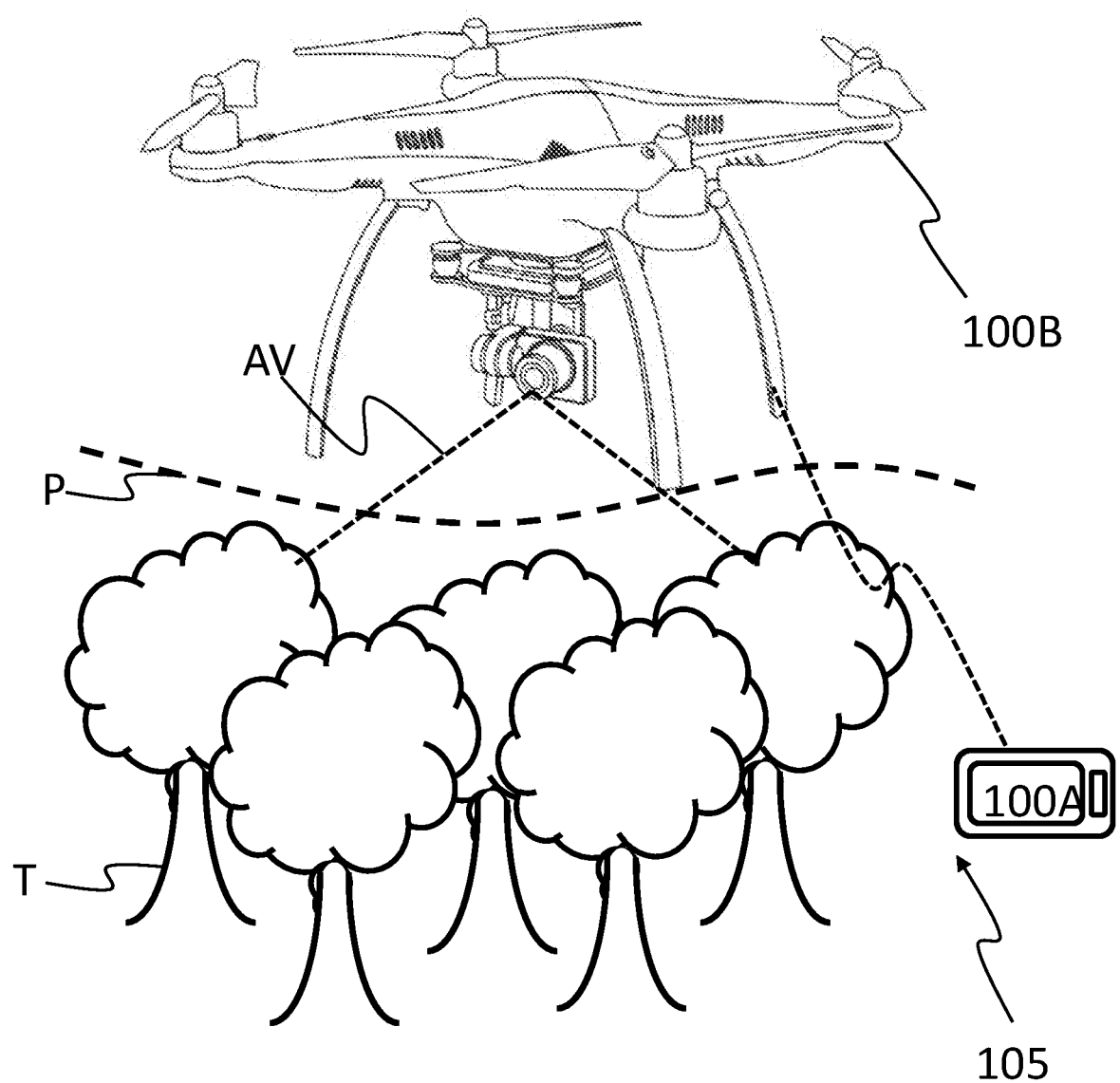
FIG. 9 shows a drone and UE system adapted in use according to one embodiment of the teachings herein.

The drone system may thus be used to execute a walk through or rather fly through of a survey area, whereby the drone is controlled to fly through an area to be surveyed and recording a video film or sequence of the area from different angles as shown in FIG. 9 where a drone 100B is controlled by a UE 100A to fly trough a survey area T.

A survey area is in one embodiment a forest area. The survey area may alternatively be an agricultural area for example a vineyard or a fruit tree farm area.

In one embodiment, which takes full advantage of the benefits of the teachings herein and utilizing the fact that drones are becoming cheaper and cheaper and that the teachings herein do not require a camera of higher quality but a normal everyday use camera is sufficient, the drone is used to carry the camera 130 to record the video which is then transmitted (possibly in real time) to the UE 100A, whereby the video recording is analyzed as per above. This makes it possible for the operator, using only equipment that is already available (smartphone) or at least not requiring a huge investments (drones starting at 200 €) to survey a forest and see the results simultaneously which enables the operator to revisit areas or recircle areas without having to actually traverse the forest area himself, and in one session getting instant results.

Figure 10:
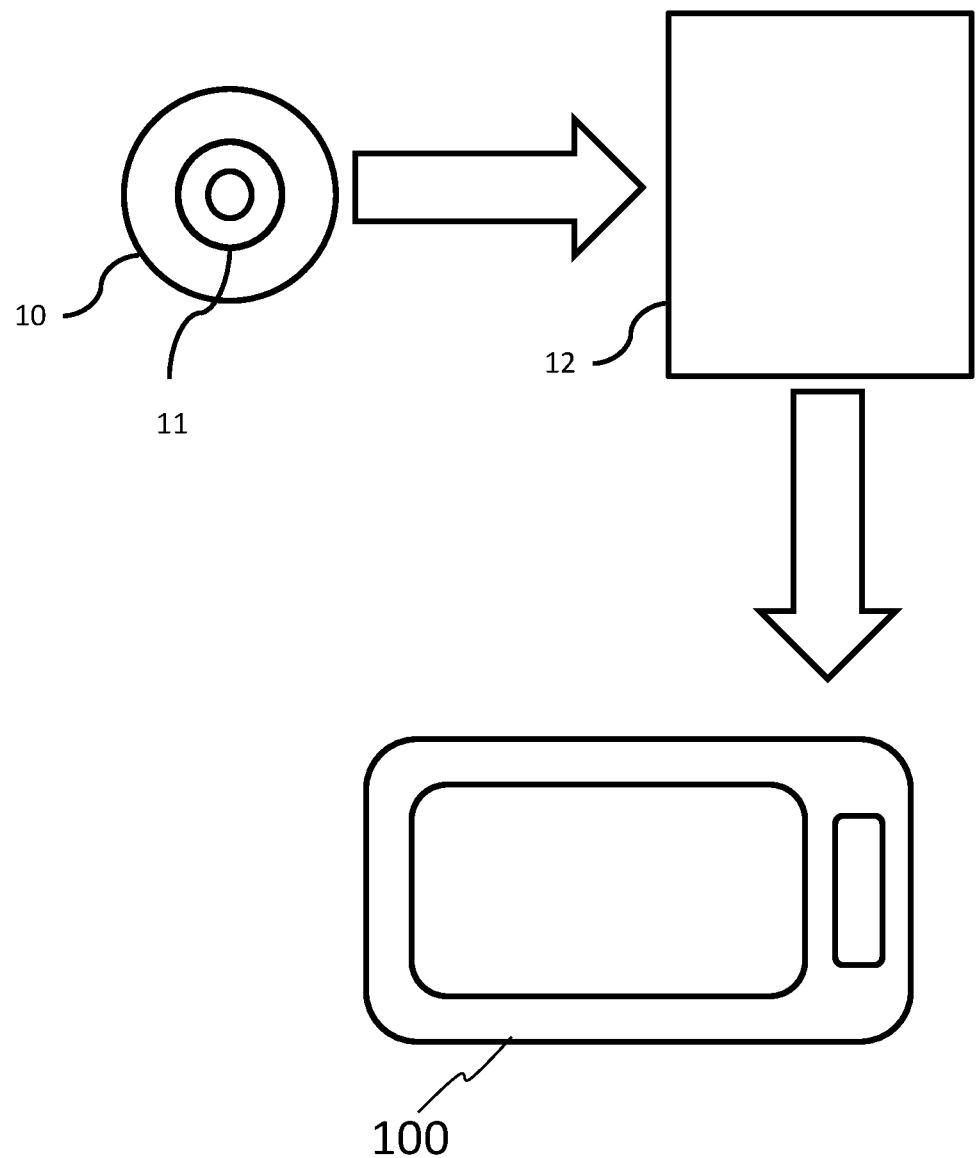
FIG. 10 shows a schematic view of a computer-readable product according to one embodiment of the teachings herein.

FIG. 10 shows a schematic view of a computer-readable product 10 according to one embodiment of the teachings herein. The computer-readable product is configured to carry or store a computer program or computer program instructions 11 along with application related data. The computer-readable product 10 may be a data disc as in FIG. 5 or a Universal Serial Bus, a memory card or other commonly known computer readable products, these being examples of transitory mediums. The computer-readable product 10 may be inserted or plugged in or otherwise connected to a computer-readable product reader 12 configured to read the information, such as the program instructions 11 stored on the computer-readable product 12 and possibly execute the instructions or to connect to a device configured to execute the instructions such as a UE 100, as the one disclosed in FIGS. 1A and 1B. The UE 100 may thus connect wirelessly or through a wired connection to a computer-readable product reader 12 (this being an example of a non-transitory medium) to receive the computer instructions 11. The UE 100 may in one embodiment comprise the computer-readable product reader 12 to receive the computer instructions 11.

In this manner a smartphone of standardized model may be upgraded to incorporate the teachings herein, by loading the computer program instructions into the controller (and/or memory) of the smartphone (or other UE) and causing the controller to execute the computer program instructions.

Figure 12:
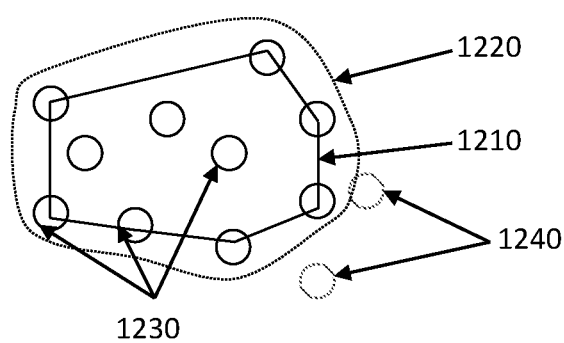
FIG. 12 is a schematic view of one example use of a user equipment according to one embodiment of the teachings herein.

As mentioned above the base area (or ground area) of the surveyed area may be determined. FIG. 11 shows a flowchart for a general method—or partial method—for determining the density of trees (or other objects) in a test area and FIG. 12 shows a schematic view of a test area. The test area comprises a plurality (or at least one) detected tree(s) 1230 and possibly a number of undetected trees 1240, i.e. trees not having a high enough confidence to be detected.

In one embodiment the base area 1220 is determined 1110—after having received and analyzed a video recording, possibly along with sensor data, as disclosed herein 1100— by determining the convex hull 1210 of detected trees 1230. The convex hull is determined is determined by including all detected trees while only "turning" in the same direction. The concept of determining a convex hull or envelope is known to a skilled person and will not be discussed in further detail herein, a convex hull being defined generally as the smallest convex set in a Euclidean plane or in a Euclidean space is the smallest convex set that contains a set of detected trees.

In one embodiment the base area 1220 equals the convex hull. In one embodiment the base area 1220 equals the convex hull with an addition of an additional area. The additional area may be determined as the convex hull plus a margin. The size of the margin may be absolute or relative. The relative margin may be relative the size of the area or the size of a detected tree or an average of detected trees 1230. The relative margin may also or alternatively be relative the distance between two detected trees or an average of distances between detected trees 1230.

The height of a tree may also be determined 1120. The height may be determined as the height of the detected tree stem. The height may also or alternatively be determined as the height of the detected tree stem plus a ratio of the height of a detected tree crown. The ratio of the tree crown that is to be added to the detected tree stem height depends on the type of tree.

In one embodiment, the height of a tree may be determined as follows.

Firstly, the three dimensional model is generated 1100 as per any method herein. As the stems of most tree types are free from leaves and as such are clean from an image handling perspective, it will be possible to detect many trees with a high confidence, i.e. most trees will be detected. In order to accomplish this, all points above a certain height are filtered out, thus allowing the manner herein to focus on the "clean" stems providing for a faster and more accurate generation of the 3D model of the stems. The height above which points are filtered out, basically correspond to the level where the tree crowns. This height may be set as a parameter, or it may be determined automatically by identifying the trees being surveyed (more on identifying tree types below). The height may thus vary from one part of the area to another, as the trees in the area vary. The height may be set as a number or by selecting or inputting a tree type corresponding to a typical height. Examples of heights are 4, 5, 6, 7 or 8 meters just to give some examples. It would be apparent to a skilled person that this height may indeed vary greatly. Even though this filtering of points over a certain heights is mentioned in relation to determining heights of trees, it should be clear that it relates to generating the three dimensional model and as such is relevant to all embodiments disclosed herein.

As the three dimensional model has been generated, the tree stems are extrapolated 1121 through and over the height of where the tree crowns are assumed to start, i.e. through the ceiling made up by the tree crowns through which details may be visibly obscured. The extrapolation is based on the assumption that stems are substantially straight.

To facilitate the extrapolation, and for enabling capture of a highest top, the extrapolation may be supplemented by further video recording 1122, possibly in combination with further sensor readings, this time aimed at the top of the trees, or at least their crowns. To enable for a height to be calculated correctly, and for matching an upper portion of a tree (such as the top of the tree or where the tree ends, the highest visible point of the tree or simply a point in the crown area of the tree to give a few examples) to a lower (detected) portion, the further video recording (and sensor reading) may be performed in a portrait mode providing a view encompassing as much as possible of the tree in one frame, possibly including some swiveling to capture the whole tree. In such an embodiment, the initial video recording may be made in a landscape mode, thereby capturing as many tree stems as possible in each frame. Alternatively or additionally, the initial video recording may be done so that it includes some segments where the full tree lengths are visible. These segments then constitute at least part of the further video recording.

The further video recording is analyzed in much the same manner using the same techniques as the initial recording, but where the upper portion and/or tree crowns are paired 1123 with the already detected (lower) portions, for facilitating the identification of where the stems are.

The pairing may be achieved by comparing camera poses and positions within a frame of the initial recording and in a frame of the further recording.

The estimated heights are visually indicated 1124 are presented on the display by extending the graphical indications used to indicate the tree stems so that it marks the whole height of the tree(s), and the operator may be given an opportunity to correct the detected tree height.

As the height has been detected, the scaling determined previously is used, possibly in combination with the distances in the 3D model, to determine the actual height 1125 of the detected tree(s), as represented by their respective cylinders.

The type of tree may be determined through image recognition or it may be input by on operator. It may also or alternatively be determined through downloading forestry data relevant for the geographical location of the test area or from previous forestry surveys. The detected tree crown may be shown to the operator using a graphical indicator being a round or oval graphical object.

In one embodiment, such as where detected trees are estimated by diverging/converging parallel lines or other such approximation, the tapering and/or even curvature of a detected tree may be determined 1130 using the teachings herein. As the tree stem is detected, the width of the tree stem is also implicitly detected or determined as being the distance between the lines (grouping of points) indicating the tree stem.

As the tapering is determined and the height is known, the volume of the detected tree(s) may also be determined 1140.

Following this the volume of trees or usable timber per acre (or other measurement) may simply be determined 1150 as the sum of the volumes of the detected trees divided by the determined base area.

If the tapering and also the curvature and general shape of the detected trees is determined, the quality of the tree—as related to the forestry industry—may also or alternatively be determined 1160. The exact manner of determining the quality of a tree varies from operator to operator and different operator may choose different manners, and as there are many alternatives available the exact manner of doing so will not be discussed in detail herein, other than that the quality reflects how much timber that may be retrieved from the tree. For example, a circular tree stem have a higher quality than an irregular or oval; a bent or curved tree stem has a lower quality than a straight tree stem.

It should be noted that this is only one manner of determining the density of trees, and many other exists For example, there are known algorithms and even tables for performing such determinations. Such algorithms and tables may be based on information such as type of trees, and such information may be determined by the UE or it may be received from a remote location. A UE according to herein may thus also be configured to determine the density based on such algorithm and/or tables.

As the teachings herein only require very little in the way of computing resources, more complicated factors and parameters such as curvature, may also be determined within a realistic time frame, thus enabling for important parameters such as the quality of the timber to be determined within a realistic time frame and using only cheap and readily available equipment.

The inventors have also realized that the exact position of a detected tree may be determined.

Figure 13:
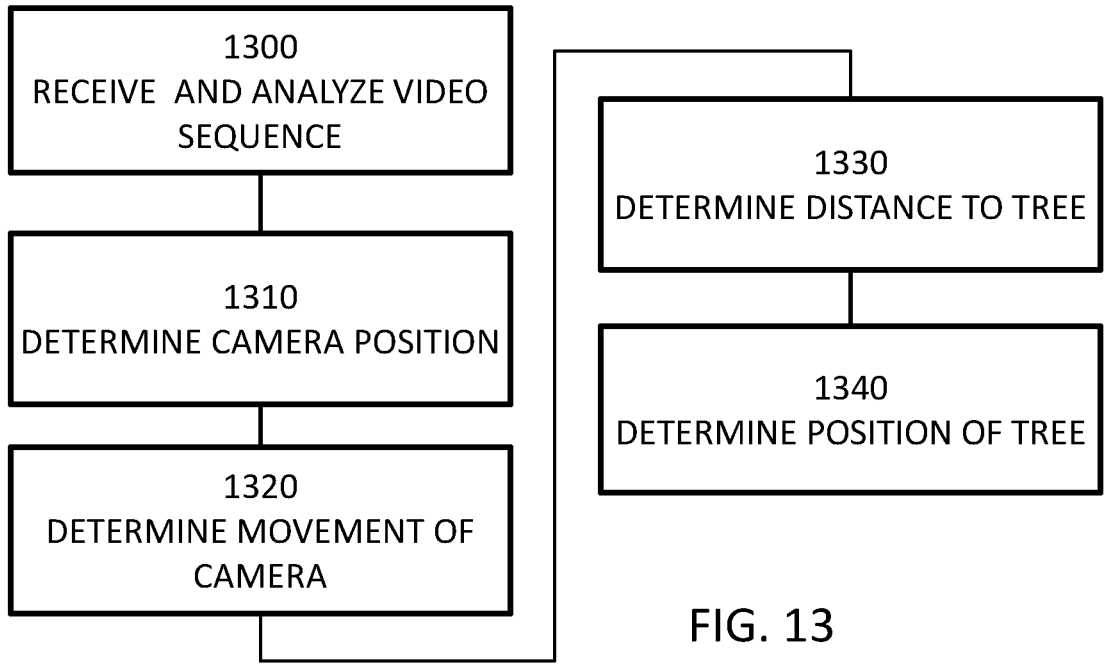
FIG. 13 is a general flowchart of a method according to one embodiment of the teachings herein.
Figure 14:
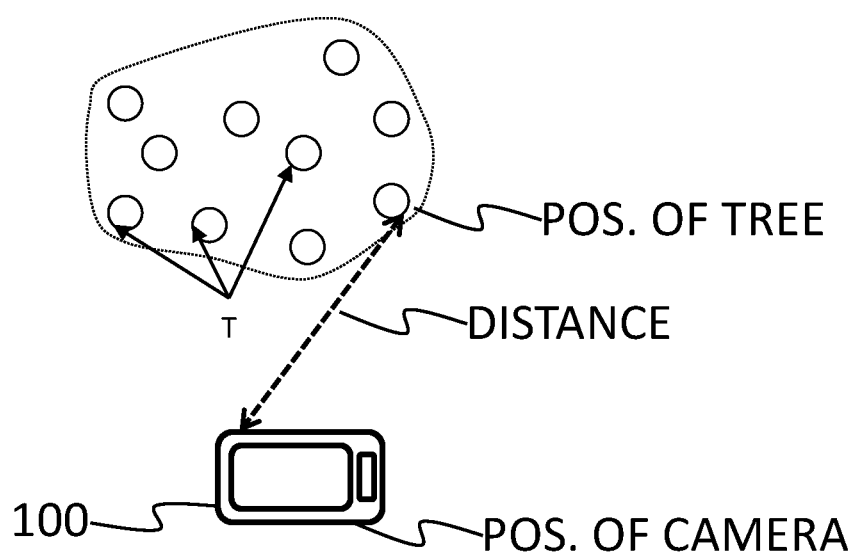
FIG. 14 is a schematic view of one example use of a user equipment according to one embodiment of the teachings herein.

FIG. 13 shows a flowchart for a general method—or partial method—for determining the position of trees (or other objects) in a test area and FIG. 14 shows a schematic view of a test area. The test area comprises a plurality (or at least one) detected tree(s) T.

In one embodiment the position of the UE 100 is determined 1310—after having received and analyzed a video recording as disclosed herein 1300—by receiving and processing location signals. The location signals may be received through a GNSS system whereby the position is determined as the geographical coordinates provided by the GNSS system. Alternatively or additionally the location signals may be received through wireless communication with base stations whereby the position is determined utilizing triangulation from base stations.

During the analysis, a relative position of the camera and how it is changed in time has been determined. Using the determined position of the camera (UE 100) at one time and relating this to the relative position of the camera at the same time, the exact movement and position of the camera (UE 100) may be determined 1320. As a scale and detected trees' relative location(s) have been determined previously, the distance and direction from the camera to a tree may be determined 1330, based upon which the exact location of the tree is determined 1340. It could be noted that in one embodiment, the whole movement of the camera along with several GNSS determined positions is used to provide an accurate determination of the absolute position of the camera based on a calculated average of positions The teachings herein thus enable an operator to detect trees and actually determine their exact individual location rather accurately, using only a simple GPS receiver (or other GNSS device) which are commonly found in most contemporary smartphones and tablets.

As has been mentioned in the above, the manner taught herein may also be used to determine the amount of timber in a log pile. To determine the mount of timber in a log is especially troublesome when the logs in the pile are of different lengths. The inventors propose to record a video sequence capturing a view surrounding the pile in so far as that the depth, the height and the width of the pile gets recorded from different angles. This may be achieved by a person simply walking the camera around the pile, possibly bringing or sweeping the camera back and forth. This also ensures that logs of different lengths are recording and later detected accurately, provided that they are visible for optical detection.

Figure 15:
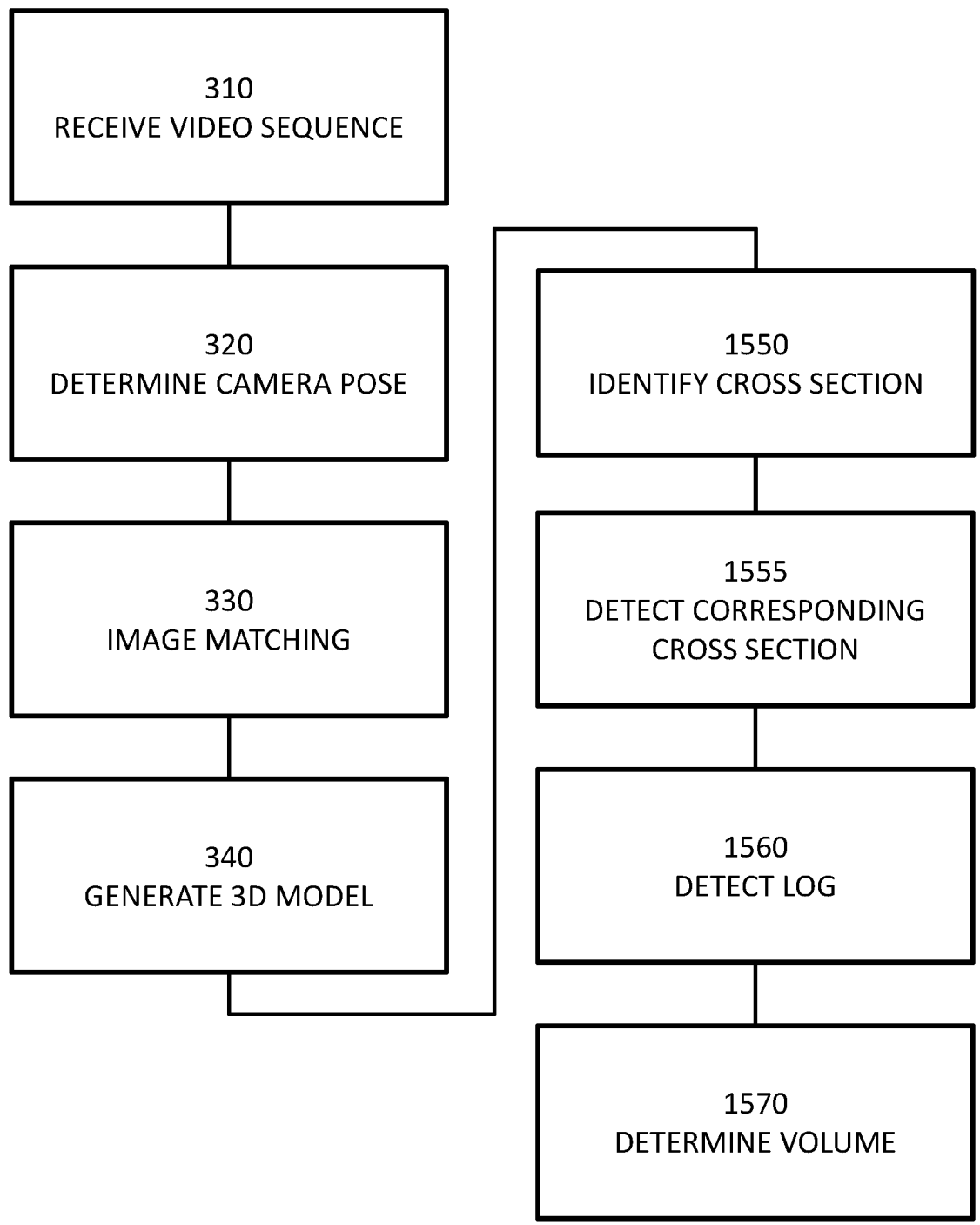
FIG. 15 is a general flowchart of a method according to one embodiment of the teachings herein.
Figure 16:
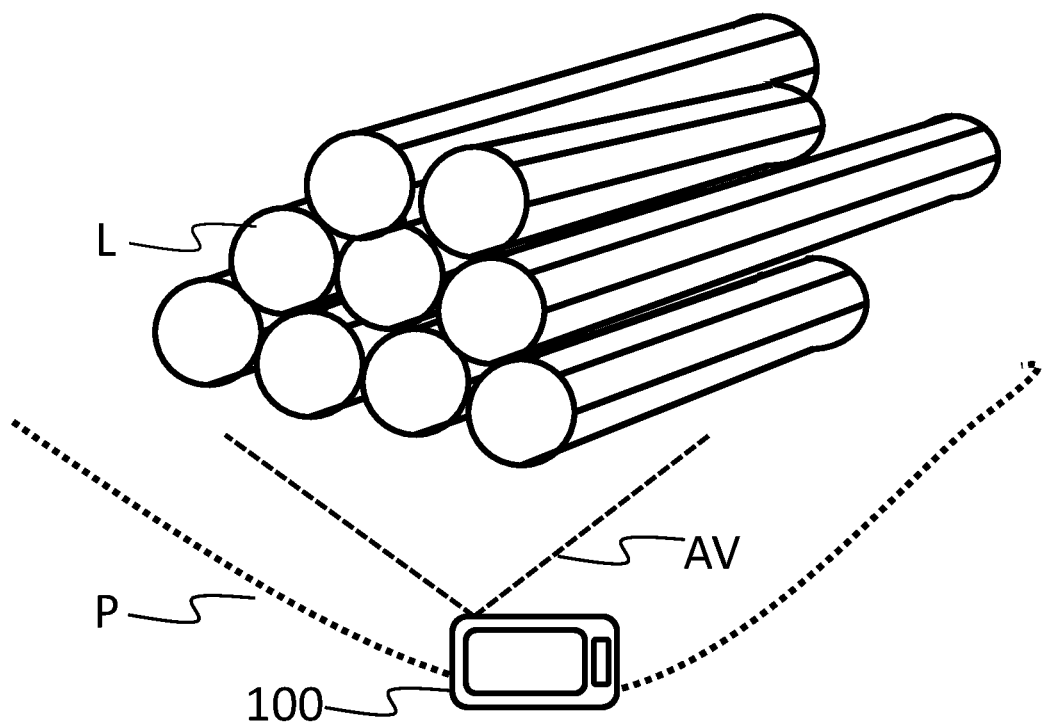
FIG. 16 is a schematic view of one example use of a user equipment according to one embodiment of the teachings herein.

FIG. 16 shows how a UE 100 holding a camera is brought along a path P so that its angle of view AV covers a pile of logs L. FIG. 15 shows a flowchart for a method of determining the volume of timber in a log pile. As discussed above with reference to FIG. 3, the UE receives a video sequence 310, determines camera poses 320 and performs image matching 330 to generate a 3D model 340. The individual logs may then be identified by detecting 1550 the cross sections or cutting areas at one end of a log L and then detecting or extrapolating to the corresponding 1555 cross section at the other end of the log. The individual log may thus be determined 1560. As the cross sections and the length of each log is thereby known, the volume of timber in the log pile may also be determined 1570. As can be seen the logs L in the pile may be of different lengths and also of different or even varying thickness (width). By utilizing the teachings herein and video recording also the backside of the pile, it is provided a manner for determining the individual lengths of the logs and their individual (approximate) variance in width, which provides for a more accurate estimation of the amount of timber in the pile.

As has been mentioned in the above, the manner taught herein may also be used to determine the amount of chippings in a pile of chippings. The inventors propose to record a video sequence capturing a view surrounding the pile in so far as that the depth, the height and the width of the pile gets recorded from different angles. This may be achieved by a person simply walking the camera around the pile, possibly bringing or sweeping the camera back and forth.

Figure 18:
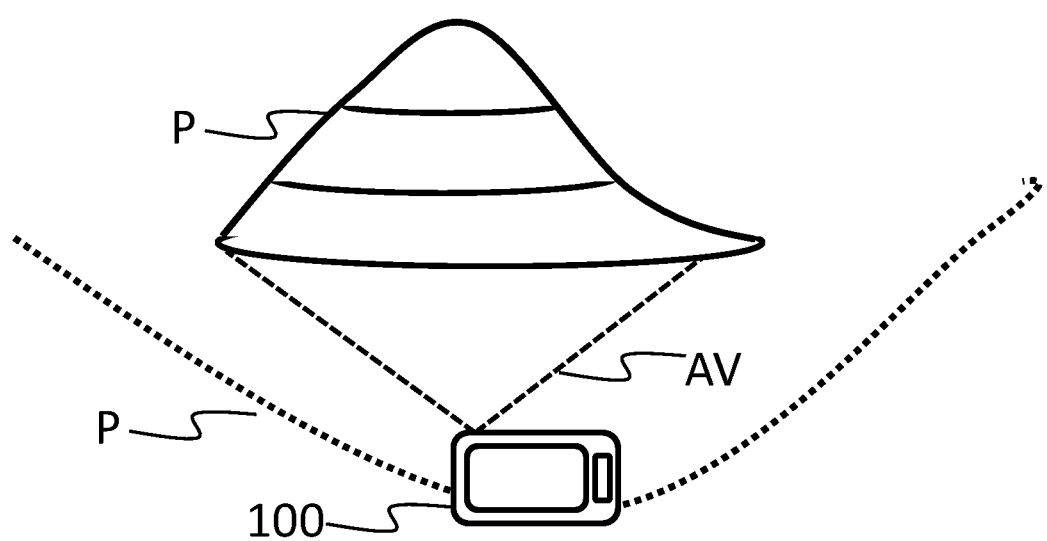
FIG. 18 is a schematic view of one example use of a user equipment according to one embodiment of the teachings herein.
Figure 17:
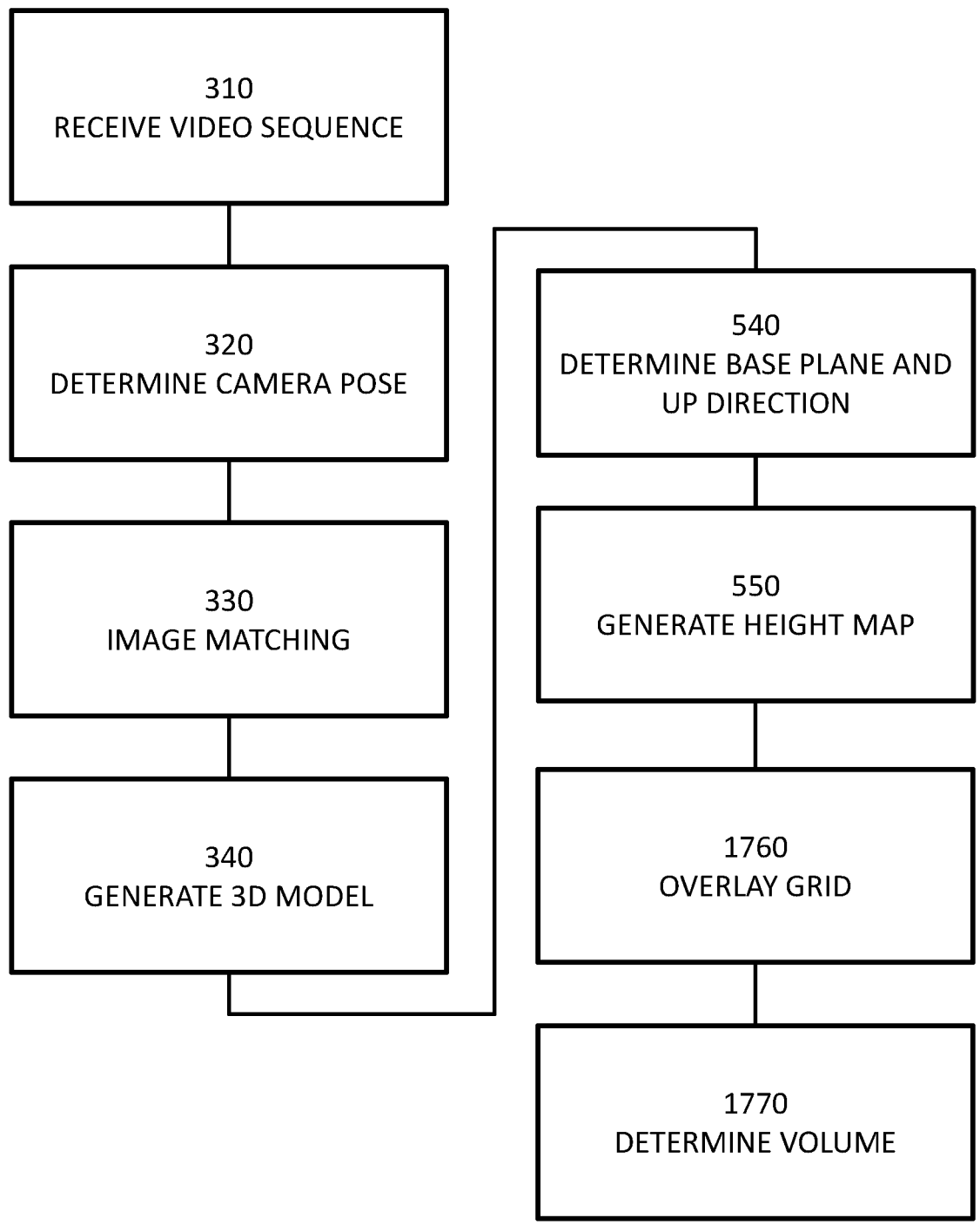
FIG. 17 is a general flowchart of a method according to one embodiment of the teachings herein.

FIG. 18 shows how a UE 100 holding a camera is brought along a path P so that its angle of view AV covers a pile of chippings. FIG. 17 shows a flowchart for a method of determining the volume of chippings in a pile. As discussed above with reference to FIG. 3, the UE receives a video sequence 310, determines camera poses 320 and performs image matching 330 to generate a 3D model 340.

The volume of the pile may then be determined by integrating along the height of the pile P. This integration may be approximated by determining 540 a base plane and generating 550 a height map. A grid is overlayed 1760 on the height map and by knowing the area of each sector of the grid, the volume may be determined 1770 by multiplying the sector area by the height of each sector in the grid.

The inventors have furthermore identified one more problem that may be solved by the teachings herein. The problem relates to surveying large forest areas. The proposed solution may also be applied to other forms of geo surveying and its use is not restricted to forestry related surveying.

Traditionally when surveying large areas the large area will be surveyed in parts or partial areas which partial areas are then stitched together to form the large area. This technique is also used to stitch together old surveys with new surveys. To identify the different partial areas markers are used. The markers, being uniquely marked with a shape or an identifier, will identify the positions of the partial areas as well as how the areas should be aligned to one another if more than one marker is used, simply by aligning the markers in the different surveys or rather results of the surveys Using markers not only requires manufacturing, transporting, installing/mounting the markers and making sure that the markers are visible or otherwise identifiable at the time of a (partial) survey, but also requires planning in where to locate them, how many should be used and what kind should be used. As there are many different surveying techniques available, there are also many different marker standards available.

The logistics involved and the planning becomes a problem especially in remote areas and areas that have not previously been surveyed and this may require a lot of man power and also take a long time as some places where a marker should be put may be very difficult to reach. The inventors have realized that these problems can be solved or at least mitigated by the fact that trees, and especially groups of trees, are unique in their appearance and also their individual placement. This is especially true for unplanned forest where threes and such grow in irregular patterns.

Thus by using the teachings herein, which provide a manner for identifying and marking the relative position of individual trees or other objects in a 3D model of an area, a first (partial) area (as represented by its 3D model) may be matched to a second (partial) area (as represented by its 3D model) as relates to relative position and alignment, by finding a set of trees, comprising at least one tree, in said first (partial) area and match this set to a set of objects in said second (partial) area are therefore proposing.

For a set comprising more than one tree, this manner only requires one set to be matched, as the arrangement of trees (or other objects) within the set will also provide for how the first and second areas are aligned with relation to one another.

Figure 19:
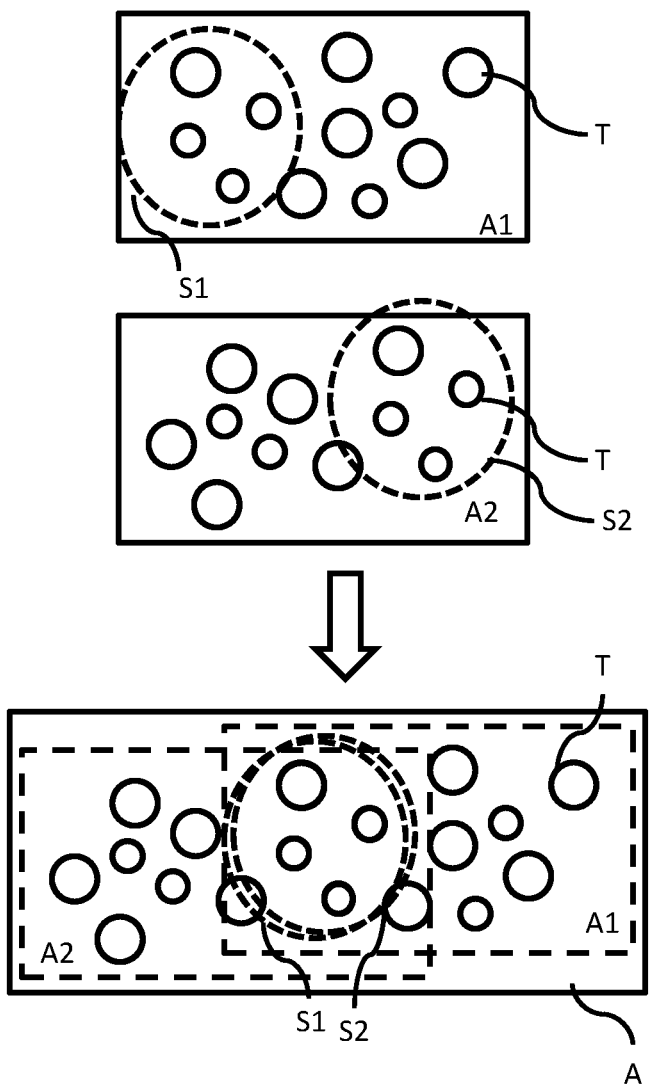
FIG. 19 shows a schematic view of a first area and a second area that are to be stitched together to form a composite area according to one embodiment.
Figure 20:
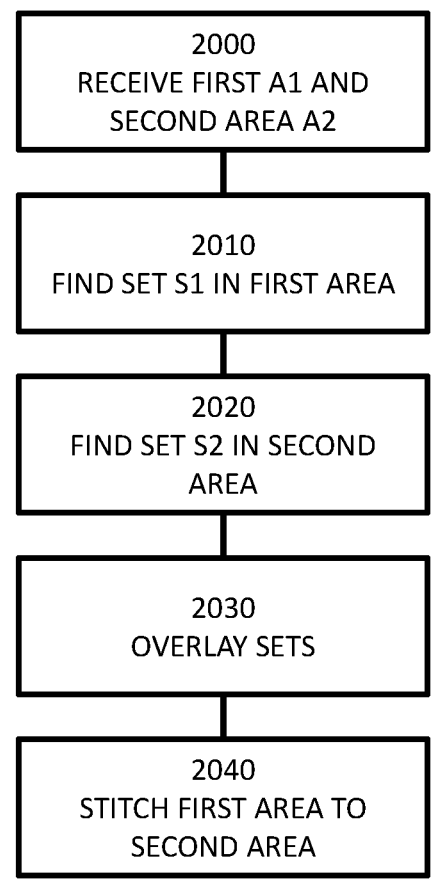
FIG. 20 is a flow chart illustrating a method for a device according to an embodiment.
Figure 21:
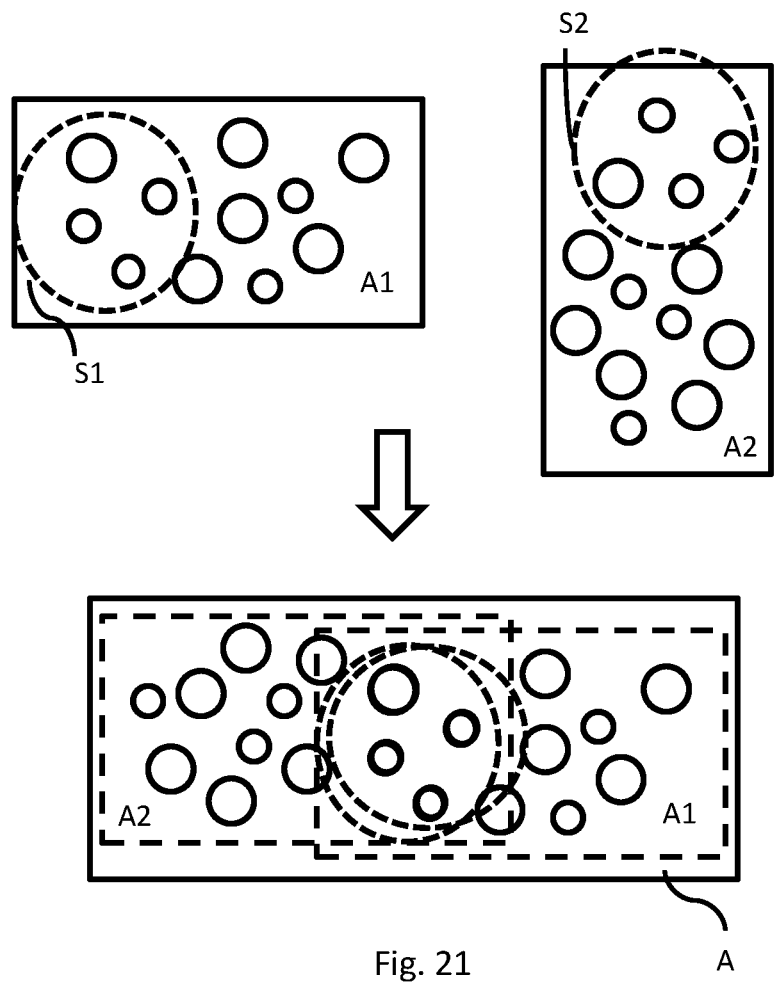
FIG. 21 shows a schematic view of a first area and a second area that are to be stitched together to form a composite area according to one embodiment.

FIG. 19 shows a schematic and exemplary view of a first (partial) area A1 and a second (partial) area A2 that are to be stitched together to form a composite area A. It should be noted that the manner may be used for stitching together areas from different surveys as well as partial areas from the same survey. In the following the areas will simply be referred to as areas, which include both partial areas of one survey as well as surveys from different surveys. FIG. 20 shows a flowchart for a method according to the teachings herein, where a first area A1 and a second area A2 is to be matched and stitched together. The areas A1, and A2 have previously been analyzed to find the individual relative positions of the objects, in this example being trees T. The individual relative positions thus being the positions of the objects with regards to one another. In one embodiment, the size of at least one object is also provided by the analysis. The method thus begins with receiving 2000 a first area A1 (or rather the 3D model representing the area, or the video recording along with any sensor data to be analyzed to generate the 3D model) and second area A2 (or rather the 3D model representing the area, or the video recording along with any sensor data to be analyzed to generate the 3D model), where the individual position of the objects in the areas are given. As the areas have been received, a set of objects S1 is to be found 2010 in the first area A1. The set may be chosen at random as simply being a set of at least one tree. However, in one embodiment the set is selected to be a set of objects at an edge of the area. This enables for a more likely matching to another area as the two areas most likely overlap along an edge.

In one embodiment the set is selected as a set of objects having an irregular pattern, wherein irregular herein means that it is not similar to the surrounding patterns of objects. As a first set S1 has been found, a second set S2 is found 2020 in the second area A2.

The second set S2 is found by finding a set of objects that correspond to the first set S1, whereby a matching of the two sets and therefore also the two areas is achieved. In one embodiment, the first set S1 and the second set S2 are found as a set of objects that exist in both areas.

The sets are found to be matching by comparing characteristics of the objects. The characteristics may be the size of the object(s), the individual position(s), the actual position of an object, tree species (kind of trees), branch structure, shape, profile, vertical bole transaction, barch texture or pattern, tree height and/or other characteristics such as discussed above.

In one embodiment, a time factor is also applied to accommodate for continued growth. For example, a tree having a specific height or width at one year will have an expected height or width at a subsequent year which may be determined using normal growth rates. As such, profiles, heights and/or widths may be adapted accordingly during the comparison to find matches.

In one embodiment, the comparison is done without relation to the scale, where only relative characteristics, such as relative sizes and/or distances between objects are taken into account, or alternatively or additionally, only the actual position of an object is taken into account.

This provides for a manner of rescaling one or both of the two areas to provide a scaled stitching into a composite area.

The scaling may be done by scaling the area(s) to be scaling so that the corresponding set corresponds to the other set. Or, when a set is found by finding matching sets(s) in the two areas, the scaling is done so that such a set may be found.

The scaling may also be done according to scaling information received along with the area information. Such scaling information may also be determined by comparing the absolute positions of two objects in an area.

As the two sets S1, and S2 have been found in the two areas A1, A2, The relative positions of the two areas may be determined 2030 by overlaying the two sets S1 and S2 and the two areas may be stitched 2040 together to form a composite area A.

In one embodiment, a rotation of one or both of the areas is also performed before stitching in order to overlay the two sets, see FIG. 11. The rotation may be done by rotating the area(s) to be rotated so that the corresponding set corresponds to the other set. Or, when a set is found by finding matching sets(s) in the two areas, the rotation is done so that such a set may be found.

The rotation may also be done according to compass or other directional information received along with the area information. Such directional information may also be determined by comparing the absolute positions of two objects in an area.

In this context an area may be taken to correspond to a plurality or set of objects. As the objects have a position, they also cover an area, whereby the two terms effectively may be regarded as interchangeable.

As previously stated this may be used to stitch partial areas for forest surveys, but may also be used for other surveys. It may be used to stitch areas belonging to the same overall survey, or to stitch newer surveys to older surveys.

By stitching together more than one area, the scaling may be determined more accurately. In part because it will be based on more data, and in part based on that one of the areas may have a more easily determined (such as explicitly indicated) scale.

In several of the described embodiments, Deep Learning may be utilized to provide improved results. Deep Learning provides a toolset for a multitude of image classification related problems, wherein a set of inputs is converted into a set of outputs using a trained image processing network. The outputs can be numbers, image masks, or other data. An example of such a network is U-Net, but many alternatives exist.

Training a deep learning network consists of creating a set of desired outputs for a set of inputs, and then for each input and output, determining the output error and adjust the network accordingly. For example the Tensorflow software package provides implementations and literature for such solutions. These normally run on a server, and the trained model is then installed for processing on target devices.

In one embodiment, we train a deep learning network to classify each pixel into, for example background, tree boundary or tree interior, and output this as an image mask. By combining this with our detected trees and camera positions, we can refine our cylinders to better determine tree diameters, 3D position, and filter out non-trees that have been erroneously detected as trees.

In another embodiment, we use the previously described image mask with a space carving algorithm, to determine all volumes in our video recording which are decisively not part of a tree. The remaining volumes will thus be further refined 3D shapes representing trees at a higher detail level than cylinders. By analyzing the difference between a straight cylinder approximating this tree, and the generated volume, we may determine the quality of said tree in the form of curvature, shape, and twists.

In one embodiment, the inventors propose to train a deep learning network to identify and label individual trees, such that an image mask will produce a new number for each unique tree in the output image mask. This would allow for further refinement of a cylinder tree diameter in a single image.

In one embodiment, we train a deep learning network to identify tree types, outputting an image mask where each pixel is a unique number specifying the tree type. By combining this with our detected trees and camera positions, we note the type of tree contained in our tree cylinder to determine the cylinder tree type.

In one embodiment, 3D point clouds and various image masks representing trees are generated. As seen above, it is then possible to identify each point belonging to a unique tree in an image without identifying clusters, and ensure only those pixels are taken into account when a tree cylinder is generated. Simultaneously, included points would then also provide additional metadata pertaining to such a tree when the tree is determined.

In one embodiment, a deep learning network is trained to identify sky and non-sky pixels. The height of a tree can then be determined as the point on an infinite cylinder where it touches the height map up until the point in any image with a known camera position where a slice in the cylinder as projected in said image only contains sky pixels.

As is shown, various metadata for a target object such as a tree can be extracted from an image mask in the same manner, given that an annotated output can be provided for an input, and therefore any such data can be decisively connected using the methodology we have shown in this invention. It is therefore not meaningful for us to describe each such metadata type in this invention, instead we make note of its inclusion as such.

In one embodiment, a deep learning network is trained to detect tree cross sections in an image, such that each cross section is provided a unique ID in the image. This directly enables counting cut trees in a pile. By matching two such images together from each side of a pile, the tapering of each tree in such a pair can be determined. This would then provide a high-quality volume detection for a tree pile together with our SLAM based scale correct position tracking as previously described.

In one embodiment, a deep learning network may be trained to detect a single optimal circle in a greyscale image. This may be used as an alternative embodiment to determine trees from density images with clusters of points projected to a plane as described elsewhere.

The inventors also propose a manner for determining when a plot has enough data to be sufficiently and accurately modeled. In one embodiment, a maximum recording time is set. In one embodiment, the UE is configured to determine when changes in output parameters for the plot are below a threshold. In one embodiment, the UE is configured to determine when the scale in our SLAM system as detected e.g. through sensor data is stable enough over time.

In one embodiment, multiple such parameters may be combined in a single threshold detector, such that all of them need be fulfilled before a plot is determined to be complete.

The inventors also propose a manner for performing Route Planning.

Route planning is the task of determining where in our target environment further surveys need to be made, given a set of constraints. Such constraints may be a set of GNSS coordinates describing the boundary of the forest, and a set of existing surveys and their parameters, and optionally external data such as existing map data describing various stands or biomes in a single forest. Additionally, constraints may be described as a target plot density, an error magnitude estimate that must be reduced below a threshold, or a set number of surveys that need to be conducted for each stand, or for the forest as a whole. Another optional input may be a time limit.

Based on given inputs, one embodiment would simply find each point in the forest at the maximum distance from all other survey points, then repeat this recursively and brute-force optimize a path between the generated points from the current user coordinates. This may be done for the whole forest, or for each stand, or based on another, similar criteria.

In another embodiment, a set of map layers may be generated over one or more parameters provided for the stand or forest, and suitable target survey points may be generated through a set of functions applied to said map layers. For example, one such map layer may show the basal area of a forest, smoothed out to fill the layer based on known data, and the derivative of said map layer may have a set of local maxima, indicating where—between two known surveys—there is a large difference in basal area, and thus where more survey data would be useful. Similarly, the distance measurement described previously could also be provided as such map layer, and the two multiplied together may provide an even better estimate.

The inventors also propose to join individual survey plots into stands, where a set of desirable parameters in the plots are similar, or otherwise correlated. In one embodiment, such a division may be determined by connected survey areas with the same major tree type.

Using our survey plot data, we may optimize over desirable properties to produce stands in a number of ways according to operator expectations. One logical plot division would be the previously mentioned major tree type stands. In our solution, we would simply find all surveys fulfilling a property, and join them in sets such that they are connected. On boundaries between stands, they are determined as a midpoint between surveys part of each corresponding stand. Stands that correlate but cannot be connected in a 2D layer are separate stands.

In another example, a stand may be divided based on both major tree type and basal area ranges.

In another embodiment, we may generate stands over all or multiple parameters automatically, such that a set of survey plots are chosen that represent a set of stands, and then all connected plots that fulfill a similarity criteria to that plot based on a threshold or operator criteria, are joined into a stand with that survey plot.

In another embodiment, an operator may provide a set of existing stands, and let the software update those stands based on survey plot parameters within each stand.

In one embodiment, an operator may provide two or more nearby plots, and the software determines similarities properties in these plots, then suggests other plots that may be related to these plots. If no similarities are found, the software provides a warning.

In one embodiment, random pairs of nearby plots are selected, and similarities between each pair are determined similar to above. If plots are dissimilar, the pair is discarded. This may be done recursively if each pair is then treated as a single plot, or a small stand. The process can then be repeated until a target number of stands have been reached.

Figure 22:
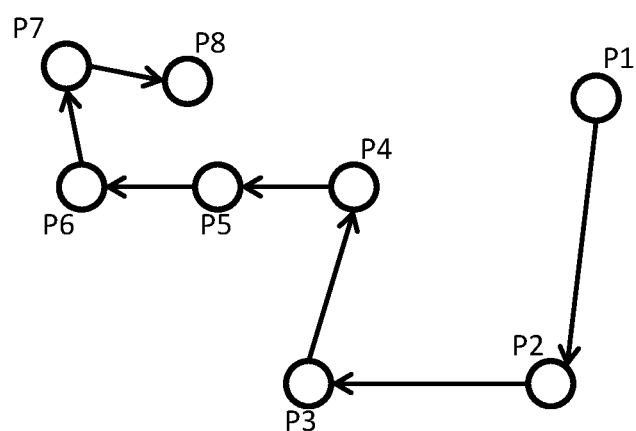
FIG. 22 shows a schematic view of a combination of generating stands and planning a route according to one embodiment.

FIG. 22 shows a schematic view of a combination of generating stands and planning a route. A UE is travelling along a path moving through points P1 to P8. As the analysis is run, the area covering points P1-P4 is noted to be of a similar type, i.e. an homogenous area, and the area is treated as one stand. However, as the area around point P5 is reached, the analysis detects that some parameters change, and that the area by point P5 is different from the previously surveyed area. To ensure a more accurate measurement, the general area of and surrounding point P5 is therefore surveyed more thoroughly by adding survey areas, as represented in FIG. 22 by a closer arrangement of points P5-P8 compared to P1-P4.

The invention claimed is:

1. A forestry surveying apparatus comprising a controller (CPU), the controller (CPU) being configured to:
receive an image stream representing a video sequence;
determine a camera pose for a second image in the image stream relative to a first image in the image stream by utilizing Simultaneous Localization And Mapping (SLAM);
match the first image with the second image, based on the camera pose; and
generate a three dimensional model based on the image match;
wherein the video sequence and the three dimensional model represent forestry related objects, wherein the controller is further configured to:
receive sensor data and
determine the camera pose and/or generating the three dimensional model based on the received sensor data, wherein the sensor data relates to one or more of positional information, comprising Global Navigation Satellite System (GNSS) data, or motion data comprising accelerometer or gyro data, wherein the controller is further configured to detect at least one tree stem in said three dimensional model by:
generating a point cloud;
determining a base plane in said point cloud;
generating a height map in said point cloud; and
filtering points in height map in said point cloud; and
thereby detecting clusters of points in remaining points in said point cloud as being tree.

2. The forestry surveying apparatus according to claim 1, wherein the controller is further configured to:
determine a movement between a first and a second camera pose;
receive accelerometer data and to
determine a scale by comparing accelerometer data to the determined movement between a first and a second camera pose.

3. The forestry surveying apparatus according to claim 1, wherein the controller is further configured to:
receive positional information along with said video sequence; and
position said detected tree stems utilizing said positional information.

4. The forestry surveying apparatus according to claim 1, wherein the controller is further configured to generate said point cloud by
determining said camera pose and then determine how much a pixel has moved relative a movement of the camera pose.

5. The forestry surveying apparatus according to claim 1, wherein the controller is further configured to determine a sample plot by determining a hull around the detected trees.

6. The forestry surveying apparatus according to claim 5, wherein the controller is further configured to determine a density of trees based on the determined height of a tree.

7. The forestry surveying apparatus according to claim 1, wherein the controller is further configured to determine the height of a tree by receiving a further video recording, wherein said further video recording is included in the video recording or wherein said further video recording is received separately from the video recording;
detecting an upper portion of a tree;
pairing the upper portion to a detected tree;
extrapolating the height of the tree to include the upper portion;
scale the detected tree; and
determine the height of the tree including the upper portion.

8. The forestry surveying apparatus according to claim 1, wherein the controller is further configured to determine a volume of timber in a log pile by, in the three dimensional model, identifying a cross section and a corresponding cross section of at least one log, and based on this determine the volume of the at least one log, wherein the video recording represents a pile of logs.

9. The forestry surveying apparatus according to claim 1, wherein the controller is further configured to determine a volume of chippings in a pile by, in the three dimensional model,
determining a base plane and an up direction;
generating a height map; and
integrating the area over the height map to determine the volume; wherein the video recording represents a pile of chippings.

10. The forestry surveying apparatus according to claim 1, wherein the controller is further configured to determine a volume of timber in a surveyed area by:
determining a base area;
determining a height of detected trees;
determining a width of detected trees; and based on this determine the volume of timber by dividing the sum of the volume of individual detected trees by the base area.

11. The forestry surveying apparatus according to claim 1, wherein the controller is further configured to determine a shape of a detected tree.

12. The forestry surveying apparatus according to claim 1, wherein the controller is further configured to determine a location of an individual detected tree by:
   determining the location of the camera providing the image stream;
   determining the distance from the camera to the tree; and based on this
   determining the location of the tree.

13. The forestry surveying apparatus according to claim 1, wherein the device is further configured to
   find a first set in a first plurality of objects,
   find a matching second set in a second plurality of objects and to
   stitch together the first plurality of objects with the second plurality of objects by overlaying the first set and the second set.

14. The forestry surveying apparatus according to claim 1, wherein the forestry surveying apparatus is a handheld User Equipment and/or a forestry surveying system further comprising an unmanned aerial vehicle, wherein said unmanned aerial vehicle comprises a camera and at least one sensor.

15. A method for forestry surveying using a forestry surveying apparatus, the method comprising:
   receiving an image stream representing a video sequence;
   determining a camera pose for a second image in the image stream relative a first image in the image stream by utilizing Simultaneous Localization And Mapping (SLAM);
   matching the first image with the second image, based on the camera pose; and
   generating a three dimensional model based on the image match;
   wherein the video sequence and the three dimensional model represent forestry related objects, wherein the method further comprises:
   receiving sensor data and
   determining the camera pose and/or generating the three dimensional model based on the received sensor data, wherein the sensor data relates to one or more of positional information, comprising Global Navigation Satellite System (GNSS) data, or motion data comprising accelerometer or gyro data, wherein the method further comprises detecting at least one tree stem in said three dimensional model by:
   generating a point cloud;
   determining a base plane in said point cloud;
   generating a height map in said point cloud; and
   filtering points in height map in said point cloud; and thereby detecting clusters of points in remaining points in said point cloud as being tree.

16. A non-transitory computer-readable medium comprising computer program instructions that when loaded into a controller, causes the method according to claim 15 to be executed.

17. The method of claim 15, wherein the forestry surveying apparatus comprises a camera and at least one sensor.

* * * * *